(12) United States Patent
Kanzaki et al.

(10) Patent No.: US 11,465,523 B2
(45) Date of Patent: Oct. 11, 2022

(54) VEHICLE ELECTRONIC CONTROL DEVICE

(71) Applicant: Mitsubishi Electric Corporation, Tokyo (JP)

(72) Inventors: Shozo Kanzaki, Tokyo (JP); Yoshikazu Ishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 416 days.

(21) Appl. No.: 16/798,988

(22) Filed: Feb. 24, 2020

(65) Prior Publication Data

US 2020/0324664 A1    Oct. 15, 2020

(30) Foreign Application Priority Data

Apr. 9, 2019  (JP) .............................. JP2019-073854

(51) Int. Cl.
*B60L 53/60*  (2019.01)
*B60L 58/12*  (2019.01)
*B60L 53/16*  (2019.01)

(52) U.S. Cl.
CPC .............. *B60L 53/60* (2019.02); *B60L 53/16* (2019.02); *B60L 58/12* (2019.02)

(58) Field of Classification Search
CPC ........... B60L 53/60; B60L 58/12; B60L 53/16
USPC ....................................................... 701/22
See application file for complete search history.

(56) References Cited

U.S. PATENT DOCUMENTS

| | | | | |
|---|---|---|---|---|
| 4,742,291 | A * | 5/1988 | Bobier | H02J 7/35 307/66 |
| 5,598,084 | A * | 1/1997 | Keith | H02J 7/0045 235/382 |
| 9,372,216 | B2 * | 6/2016 | Kanayama | G01R 27/02 |
| 9,944,270 | B2 * | 4/2018 | Nawata | B60K 6/46 |
| 10,873,193 | B2 * | 12/2020 | Yan | H02J 7/00 |
| 10,919,467 | B2 * | 2/2021 | Link | B60L 50/51 |
| 11,303,147 | B2 * | 4/2022 | Yen | H02J 7/007182 |
| 2014/0184162 | A1 * | 7/2014 | Takahashi | H01M 10/0525 320/128 |

(Continued)

FOREIGN PATENT DOCUMENTS

DE  102014218418 A1 *  3/2015 ............. B60L 11/18
JP  2011-114962 A  6/2011

(Continued)

*Primary Examiner* — Suresh Memula
(74) *Attorney, Agent, or Firm* — Sughrue Mion, PLLC; Richard C. Turner

(57) ABSTRACT

A standby current of an arithmetic control unit configured to execute a control operation based on an activation signal generated by an uncertain manual operation is suppressed. A power supply relay configured to supply power to an arithmetic control unit is driven so as to be closed by a power supply switch, to thereby apply drive control to a main electric apparatus, and apply drive control to an auxiliary electric apparatus in accordance with a composite activation signal generated by an activation signal processing unit responding to closing operations of activation command elements even when the power supply switch is opened. As a result, a standby current generated in the activation signal processing unit is greatly suppressed compared with a case in which the arithmetic control unit is intermittently activated.

10 Claims, 19 Drawing Sheets

(56) References Cited

U.S. PATENT DOCUMENTS

| | | | |
|---|---|---|---|
| 2014/0184165 A1* | 7/2014 | Takahashi | H01M 10/486 |
| | | | 429/90 |
| 2014/0232355 A1 | 8/2014 | Masuda et al. | |
| 2014/0316679 A1* | 10/2014 | Nishida | F02D 41/20 |
| | | | 701/104 |
| 2015/0286233 A1* | 10/2015 | Takemoto | B60L 3/0084 |
| | | | 700/297 |
| 2021/0226456 A1* | 7/2021 | Takahashi | H02J 7/0069 |

FOREIGN PATENT DOCUMENTS

| | | | | |
|---|---|---|---|---|
| JP | 2013018343 A * | 1/2013 | | H02P 29/0241 |
| JP | 2014-030283 A | 2/2014 | | |
| JP | 5462387 B1 * | 4/2014 | | F02D 41/20 |
| JP | 2015-089152 A | 5/2015 | | |
| JP | 6698909 B1 * | 5/2020 | | B60L 53/16 |
| WO | 2013/054387 A1 | 4/2013 | | |

\* cited by examiner

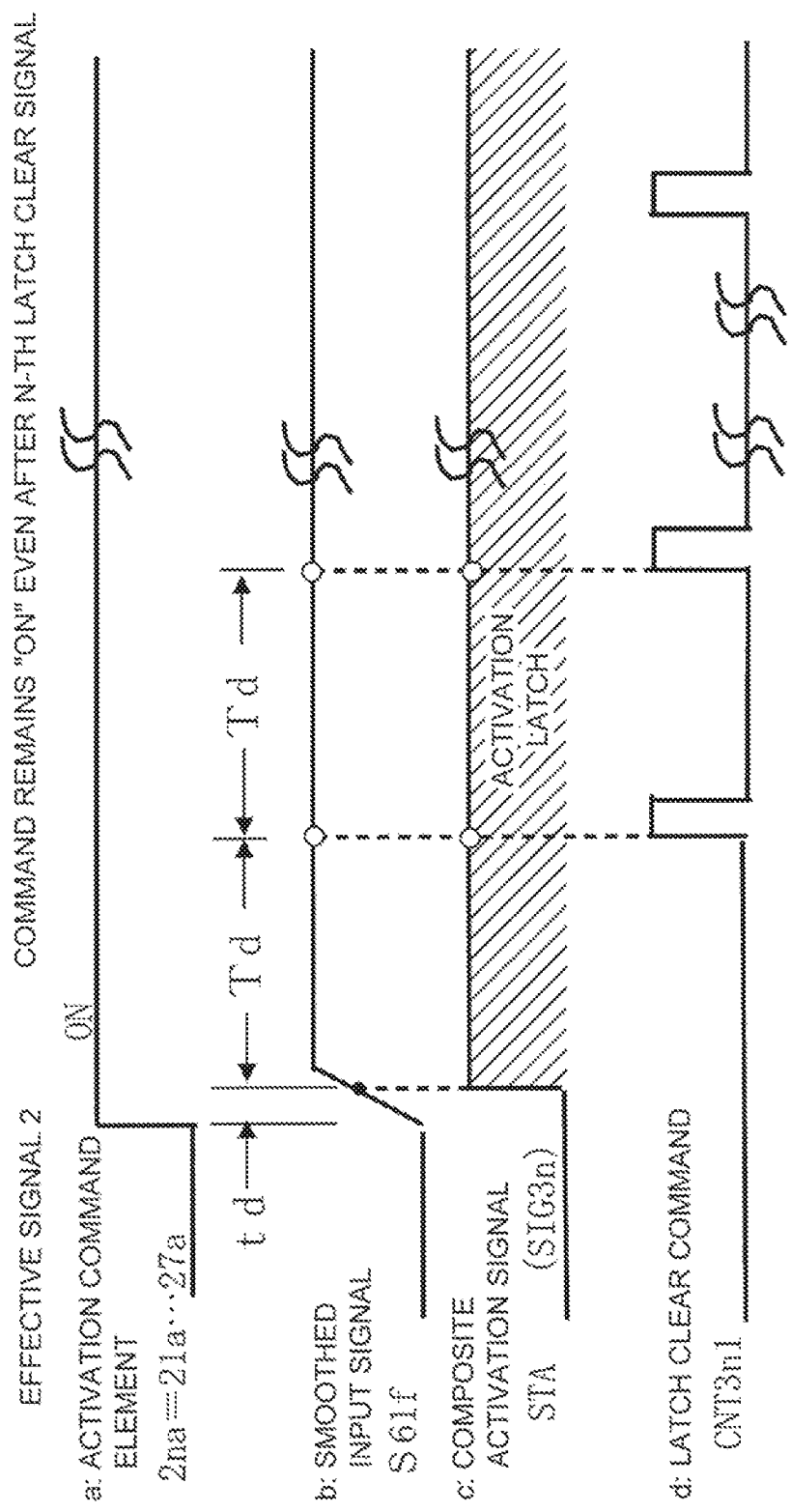

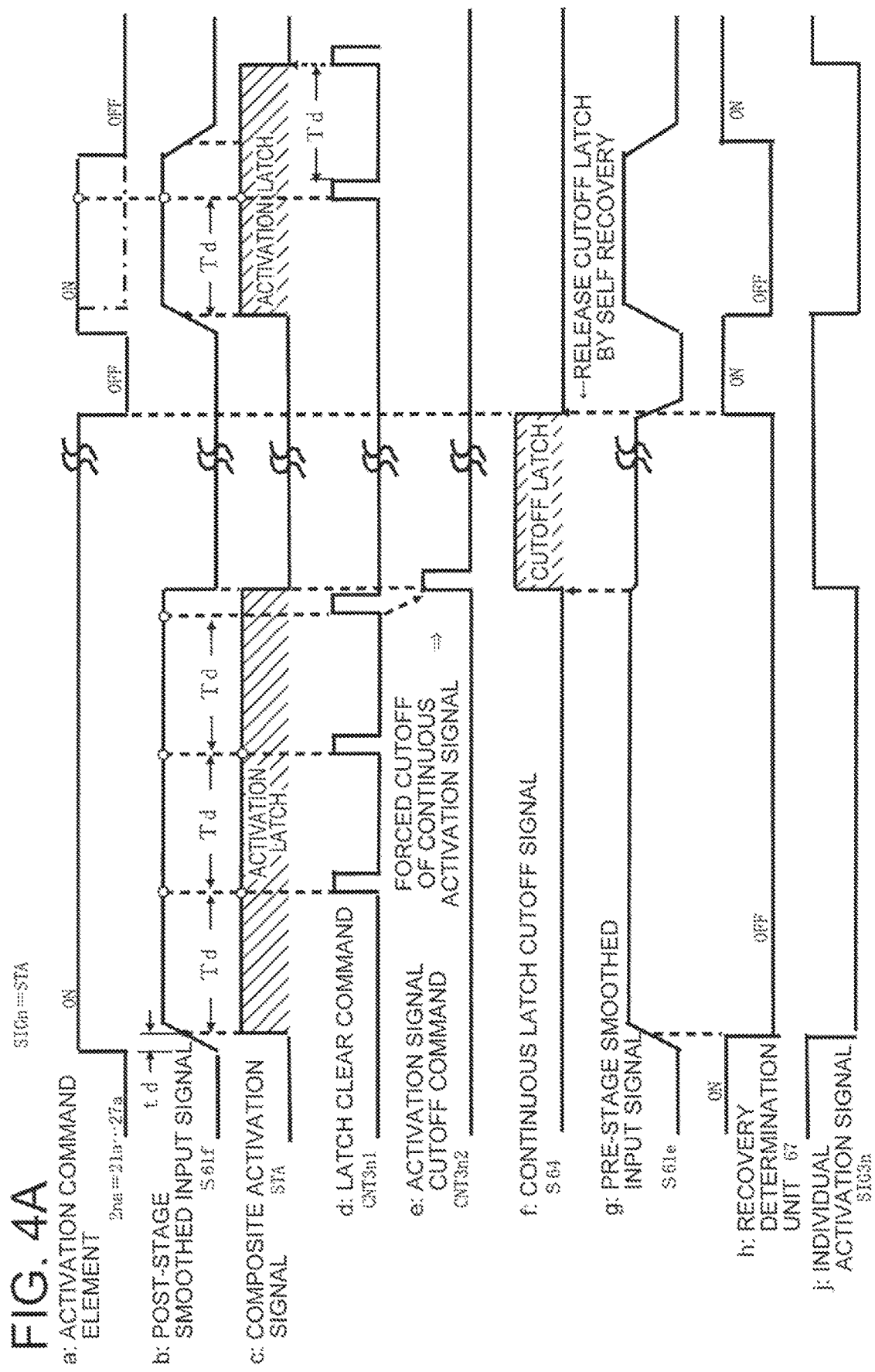

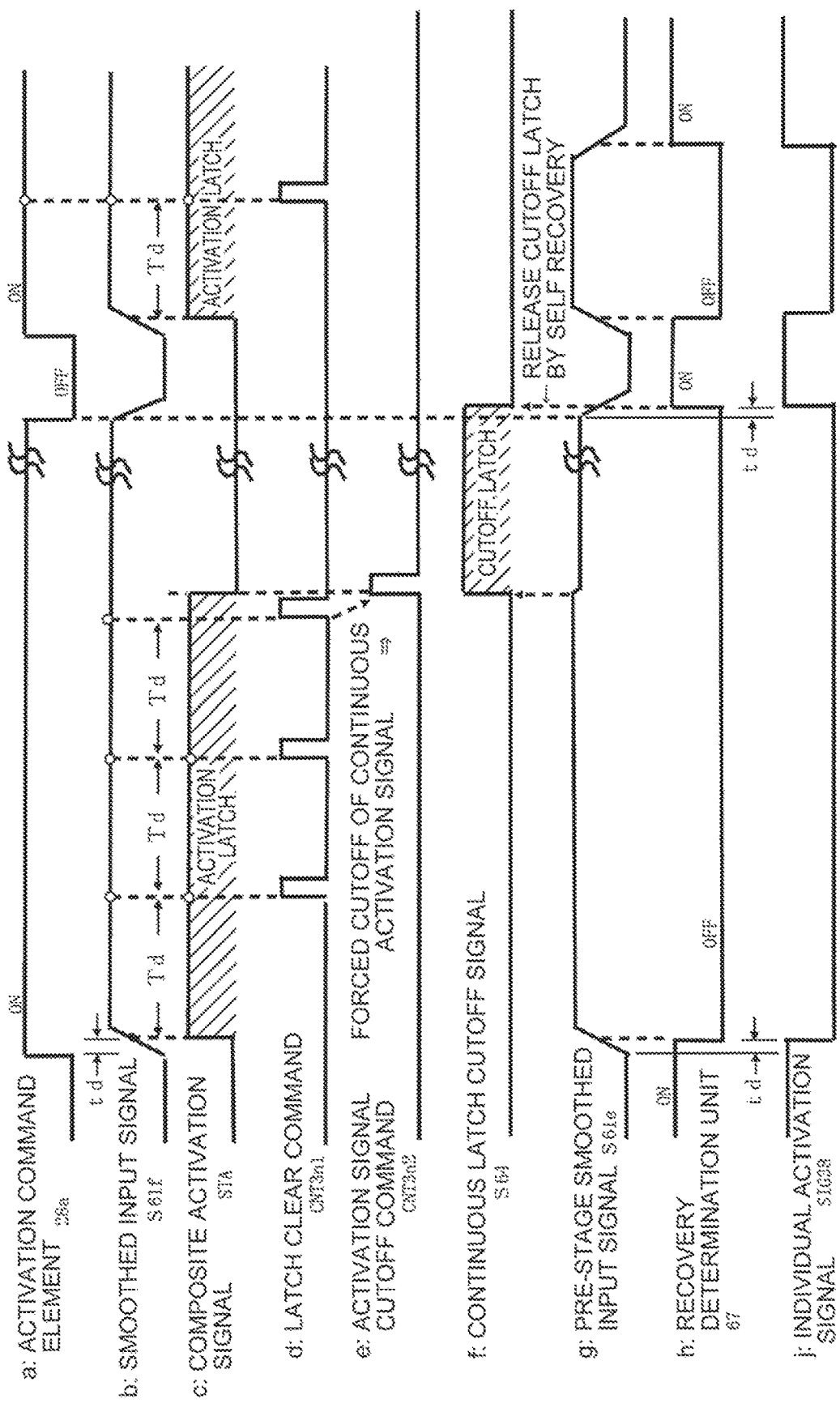

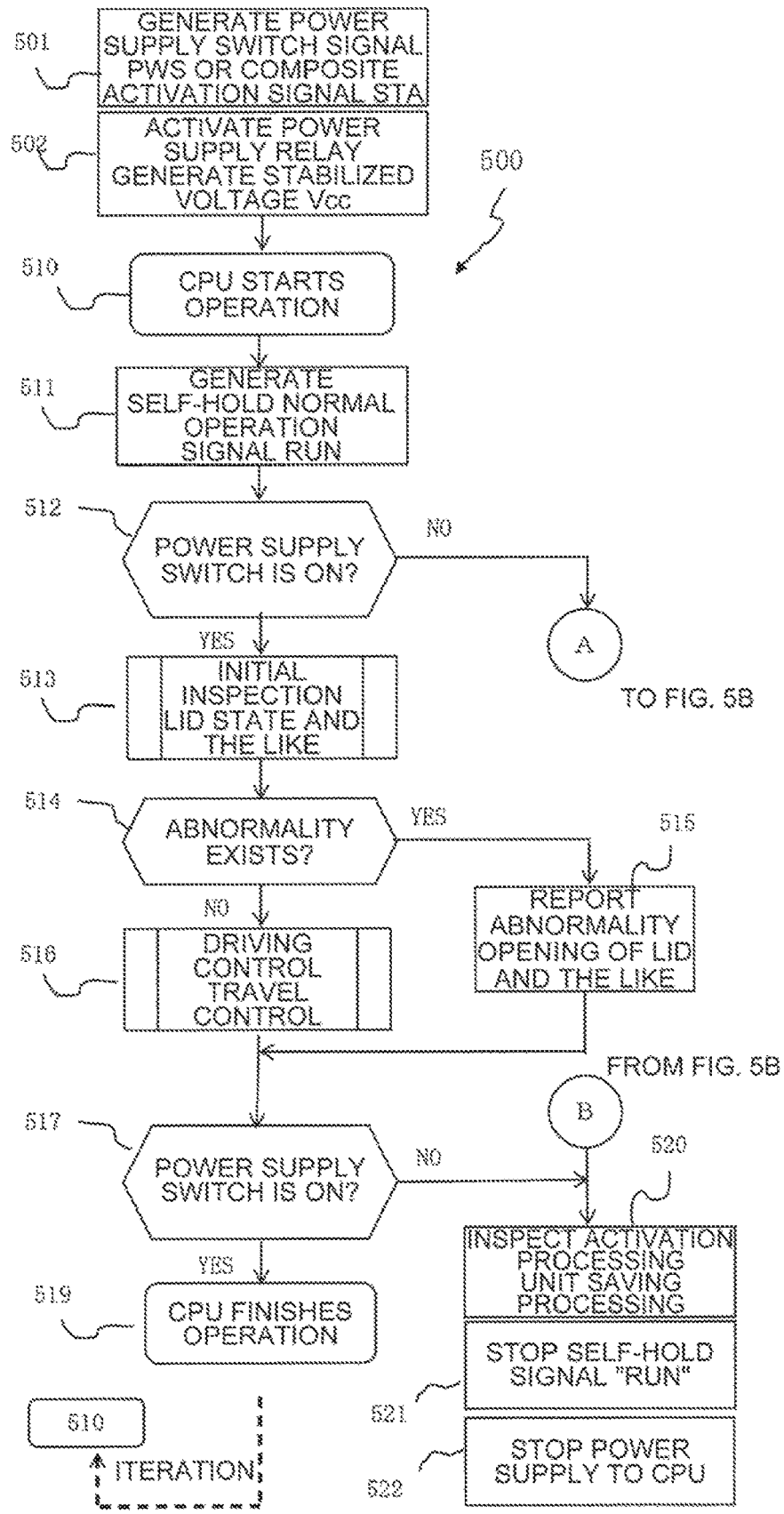
FIG. 5A  TURN ON POWER SUPPLY SWITCH

VEHICLE ELECTRONIC CONTROL DEVICE

BACKGROUND OF THE INVENTION

1. Field of the Invention

The present invention relates to improvement of an in-vehicle electronic control device including an activation signal processing unit configured to be supplied with power from an in-vehicle battery for control to execute drive control for a main electric apparatus during a period in which a power supply switch for vehicle driving is closed to be in a conductive state, and to be able to execute drive control for an auxiliary electronic control device even when the power supply switch is opened to be in a cutoff state. In particular, the present invention relates to improvement of an activation signal processing unit of an in-vehicle electronic control device suitable for a case in which the main electric apparatus is a motor controller configured to supply power from an in-vehicle main battery to drive a motor for traveling of an electric vehicle, and the auxiliary electric apparatus is a charge control unit configured to charge the main battery and an auxiliary battery for the control, from a ground power supply.

2. Description of the Related Art

Referring to FIG. 1 of Japanese Patent Application Laid-open No. 2015-089152 having a title of "POWER STORAGE SYSTEM", which is a configuration example of an in-vehicle apparatus configured to charge an in-vehicle main battery configured to supply power to a motor for traveling for an electric vehicle from a ground power supply, an assembled battery configured to supply power to a motor generator through a main relay is charged from a ground DC power supply through a first charge relay, or charged from a ground AC power supply through a second charge relay. Further, all of the main relay, and the first and second charge relays are selectively closed by an in-vehicle controller.

A general household commercial AC power supply is used as the AC power supply, and is suitable for a small current/long period night charge. As features of the AC power supply, ground ancillary equipment does not exist, and it is only required to connect a charge cable to the AC power supply. Such a power supply is generally referred to as "normal charge type". Meanwhile, the DC power supply is installed in a charge station, and enables a large current/short period charge. The DC power supply is thus suitable for temporary replenishment for an insufficient amount of a remaining charge amount in a short period of time away from home/office, and is generally referred to as "fast charge type".

Referring to FIG. 1 of Japanese Patent Application Laid-open No. 2011-114962 having a title of "CHARGE SYSTEM, CHARGER, MOTOR-DRIVEN VEHICLE AND METHOD FOR CHARGING BATTERY FOR THE MOTOR-DRIVEN VEHICLE (hereinafter referred to as 'charge system')", which is an example of a DC power supply system suitable for the fast charge as a ground facility, a charge cable for connecting a ground charger and an electric vehicle to each other includes a charge line for supplying power, a communication line using a digital signal, and a control line using an analog signal. Further, signs of start and finish of a charge control sequence are communicated between the charger and the electric vehicle, and a communication procedure therefor is described in accordance with the CHAdeMO (trademark) standard.

Moreover, referring to FIG. 2 and FIG. 4 of Japanese Patent Application Laid-open No. 2014-030283 having a title of "EXTERNAL FEEDER FOR ELECTRIC VEHICLE", which is configured to be able to execute a normal charge from a commercial AC power supply, and also to supply power to home electric appliances, a charge gun for battery charging to be connected to a normal charge port or an adaptor for home electric appliance power supply includes a second resistor connected in series to a first resistor and a switch connected to the second resistor in parallel. Further, a third resistor is connected in parallel to a serial circuit of the first and second resistors on a vehicle side, and a fourth resistor is connected in series to the third resister so that a reference voltage is applied thereto. Moreover, values of the first and second resistors are different from each other between the charge gun and the adaptor, and a vehicle controller receives a voltage between both ends of the third resistor as a connection signal so as to detect which one of the charge gun and the adaptor is connected, to thereby execute charge control or discharge control.

Referring to FIG. 3 of WO 2013/054387 A1 having a title of "CHARGING CONTROL DEVICE FOR VEHICLE, AND VEHICLE EQUIPPED WITH SAME", which is configured to suppress a decrease in battery voltage due to a standby current (dark current) consumed while a vehicle system is stopped, in the normal charge system and the fast charge system: (1) until a first signal (connection of a charge cable) indicating an intention of a charge request by a user is detected, a main clock is stopped, and a mode is set to a first rest mode (sleep mode) in which the first signal is received as a hardware interrupt; (2) when the first signal is detected, the main clock operates, and the mode proceeds to a normal mode (wakeup mode); (3) when the charge is finished, the mode proceeds to an intermittent activation mode, in which a second rest mode (wait mode) in which the main clock is operated, and the normal mode (wakeup mode) are alternately switched; and (4) when a second signal (disconnection of the charge cable) indicating an intention of the user to finish the charge is detected, the mode proceeds to the first rest mode.

(1) Description of Problems of Related Art

In the systems for the normal charge using the commercial AC power supply and the fast charge using the ground charger, which are described in Japanese Patent Application Laid-open No. 2015-089152, Japanese Patent Application Laid-open No. 2011-114962, and Japanese Patent Application Laid-open No. 2014-030283, specific roles of the in-vehicle electronic control devices are not described, but the following problem remains in WO 2013/054387 A1, which proposes the measures for suppressing the standby current (dark current), which is a problem as the in-vehicle electronic control devices for those charge systems. The in-vehicle electronic control device included in an electric vehicle integrally controls a motor control unit configured to operate when a power supply switch for driving is closed, to thereby control a power conversion unit for the motor for traveling, and a charge control unit configured to operate mainly when the power supply switch for driving is opened, to thereby control a power conversion unit for a main battery for motor drive. Thus, the capacity of a program memory for a main CPU, which is a microprocessor forming the in-vehicle electronic control device, is huge, and a start delay period required for a start inspection therefor and an after-run period required for processing of saving current state before operation stop increase. As a result, for example, one second of inactive period occurs in total in activating and stopping once.

Meanwhile, in WO 2013/054387 A1, attaching and detaching the charge cable and turning on and off of the ground power supply switch are manual operations, and hence a period from the connection of the charge cable to the turning on of the ground power supply switch may be an uncertain long period. Further, a period from the completion of the charge of the battery to the disconnection of the charge cable may also be an uncertain long period.

Accordingly, a total period in the intermittent activation time period occurring from the connection to the disconnection of the charge cable may be an uncertain long period. Further, while an intermittent activation interval is required to be short to quickly detect timings of occurrences of the attachment and the detachment of the charge cable, a power supply of the above-mentioned inactive period (for example, one second) of the microprocessor or more is required for one time of intermittent activation.

As a result, when the in-vehicle main battery for the motor drive is charged from the ground power supply in an unattended state, it is difficult to suppress the standby current though use of the intermittent activation of the in-vehicle electronic control device applied to the electric vehicle, and a more effective measure is thus required to be used.

SUMMARY OF THE INVENTION (2) Description of Object of Invention

The present invention provides an activation signal processing unit provided with a plurality of activation command elements so as to be able to greatly suppress a standby current generated in an entire arithmetic control unit. The arithmetic control unit, which is supplied with power from an in-vehicle battery through a power supply relay configured to respond to a closing operation of a power supply switch so as to execute drive control for a main electric apparatus, is configured to be activated so as to apply drive control to an auxiliary electric apparatus in response to closing operations of the plurality of activation command elements even when the power supply switch is opened. In particular, the present invention provides an in-vehicle electronic control device including an activation signal processing unit suitable for charge control to be applied to an electric vehicle.

According to at least one embodiment of the present invention, there is provided an in-vehicle electronic control device including an activation signal processing unit. The in-vehicle electronic control device includes an arithmetic control unit configured to execute a control program serving as main control operation means for starting a control operation through application of a stabilized voltage Vcc from an in-vehicle battery a through power supply relay configured to respond to a closing operation of a power supply switch and a stabilized power supply so that a normal operation signal RUN is generated, maintaining a closing operation of the power supply relay, and monitoring drive control for a main electric apparatus and a reaction state to the drive control. The arithmetic control unit is configured to transfer and save at least a part of latest current information to a nonvolatile memory when the power supply switch is opened, then stop the normal operation signal RUN, and de-energize and stop the power supply relays. The arithmetic control unit is also configured to execute a control program serving as auxiliary control means for activating the arithmetic control unit in response to closing operations of a plurality of activation command elements even when the power supply switch is opened, and monitoring drive control for an auxiliary electric apparatus and a reaction state to the drive control. The activation signal processing unit includes a plurality of individual activation processing units, to which respective activation command signals each responding to an opened state and a closed state of the activation command element are to be input. Apart of the plurality of activation command elements are configured to generate the activation command signal, which is uncertain and short in period, and are represented by push button switches, and another part thereof are configured to generate the activation command signal, which is uncertain and long in period, and are represented by any one of toggle switches and push/pull plugs to be changed to any one of a closed state and an opened state by a manual operation.

Further, each of the plurality of individual activation processing units includes an activation latch unit configured to store generation of a corresponding one of the activation command signals, couple composite activation signals STn, each of which is an output signal from the activation latch unit, to one another so as to form a logical OR, to thereby generate a composite activation signal, and generate an individual activation signal SIG3$n$ for individually inputting a generation state of a corresponding one of the activation command signals to the arithmetic control unit. The arithmetic control unit is configured to: start the control operations when the stabilized voltage Vcc is applied through the power supply relay to be driven so as to be closed in response to the composite activation signal, and use the normal operation signal RUN to maintain the operation state of the power supply relay; and read the individual activation signals SIG3$n$ to execute the drive control for the auxiliary electric apparatus, and generate an activation signal cutoff command CNT3$n$2 for stopping the output of the activation latch unit until the generation of the normal operation signal RUN is stopped as a result of any one of operation confirmation accompanying the drive control and determination of elapse of a predetermined period. The individual activation processing unit further includes a cutoff latch unit and a recovery determination unit. The cutoff latch unit is configured to be driven so as to be set by the activation signal cutoff command CNT3$n$2, and stop the generation of the composite activation signal STn when the plurality of activation command elements are in any one of a normally closed state and an abnormally closed state. The recovery determination unit is configured to reset the cutoff latch unit when the plurality of activation command elements are in any one of a normally opened state and in a returned-to-opened state, and enable the generation of the composite activation signals STn when the plurality of activation command elements are closed.

As described above, the in-vehicle electronic control device including the activation signal processing unit according to at least one embodiment of the present invention includes the arithmetic control unit configured to be supplied with the power from the stabilized power supply during the operation period in which the power supply switch is closed, to thereby execute the drive control for the main electric apparatus, transfer and save, for example, learned information or abnormality occurrence information having occurred in the operation period from a volatile RAM memory to a nonvolatile data memory or program memory while maintaining the power supply state in accordance with the normal operation signal RUN even when the power supply switch is opened, and be brought into a state in which the power supply is stopped when the normal operation signal RUN is stopped as a result of completion of the save processing. In the in-vehicle electronic control device, the individual activation processing unit configured to respond to the opened/closed states of the activation command signals S31, S32, . . . , S3n generated by the plurality of activation command elements is added. The individual activation processing unit includes the activation latch unit configured to individually store the generation of the activation command signal S3n (n=1, 2, . . . , n), and is configured to generate each of the composite activation signals STA to STC obtained by coupling the output signals of the activation latch units to one another so as to form the logical OR, and generate the individual activation signal SIG3n for individually inputting the generation state of the activation command signal S3n to the control input terminal of the arithmetic control unit.

Moreover, the arithmetic control unit is configured to be applied with the stabilized voltage in response to the composite activation signal, to thereby start the control operation, and be maintained in the power supply state in accordance with the normal operation signal RUN. Further, the arithmetic control unit is configured to read the individual activation signal SIG3n to apply the drive control to a part of the auxiliary electric apparatus, and stop the generation of the normal operation signal RUN in response to a response signal thereto or an excessive elapsed period.

Thus, when the activation command element is, for example, a push button switch, and a depression operation is executed for a relatively short period, even when the depression period is shorter than a voltage rise period of the stabilized power supply and an inactive period of the arithmetic control unit required for a self-diagnosis required period, the composite activation signal can certainly be generated by the activation latch unit to activate the arithmetic control unit. Before the arithmetic control unit stops the operation, the composite activation signal can be released by the cutoff latch unit. Therefore, the following effect is provided. Various types of auxiliary control can easily be executed by the arithmetic control units even at a time point at which the power supply switch is not closed. There is also provided such an effect that an unnecessary power supply state is not generated so that a wasteful discharge of the in-vehicle battery can be prevented, by releasing the composite activation signal at a time point at which the auxiliary control by the arithmetic control unit is completed even when a short-circuit abnormality occurs in the push button switch, or the activation command element executes an uncertain long-period closing operation.

Moreover, when the closed activation command element is once opened, the recovery determination unit releases the cutoff operation by the cutoff latch unit. Thus, when the activation command element executes the uncertain long period closing operation, the auxiliary control is enabled again by the activation command element being closed again, and the cutoff latch unit is activated so as to execute power saving operation during the closing operation for a long period. Therefore, the following effect is provided. The common individual activation processing units can be applied even when the activation command elements are different from one another in operation characteristics.

BRIEF DESCRIPTION OF THE DRAWINGS

FIG. 3B is a second example chart of the time chart for illustrating the operation of FIG. 2A.

FIG. 4A is a third example chart of the time chart for illustrating the operation of FIG. 2A.

FIG. 4B is a fourth example chart of the time chart for illustrating the operation of FIG. 2B.

FIG. 5A is a flowchart for illustrating an operation relating to main control operation means of FIG. 1.

DESCRIPTION OF THE EMBODIMENTS

First Embodiment

Figure 1:
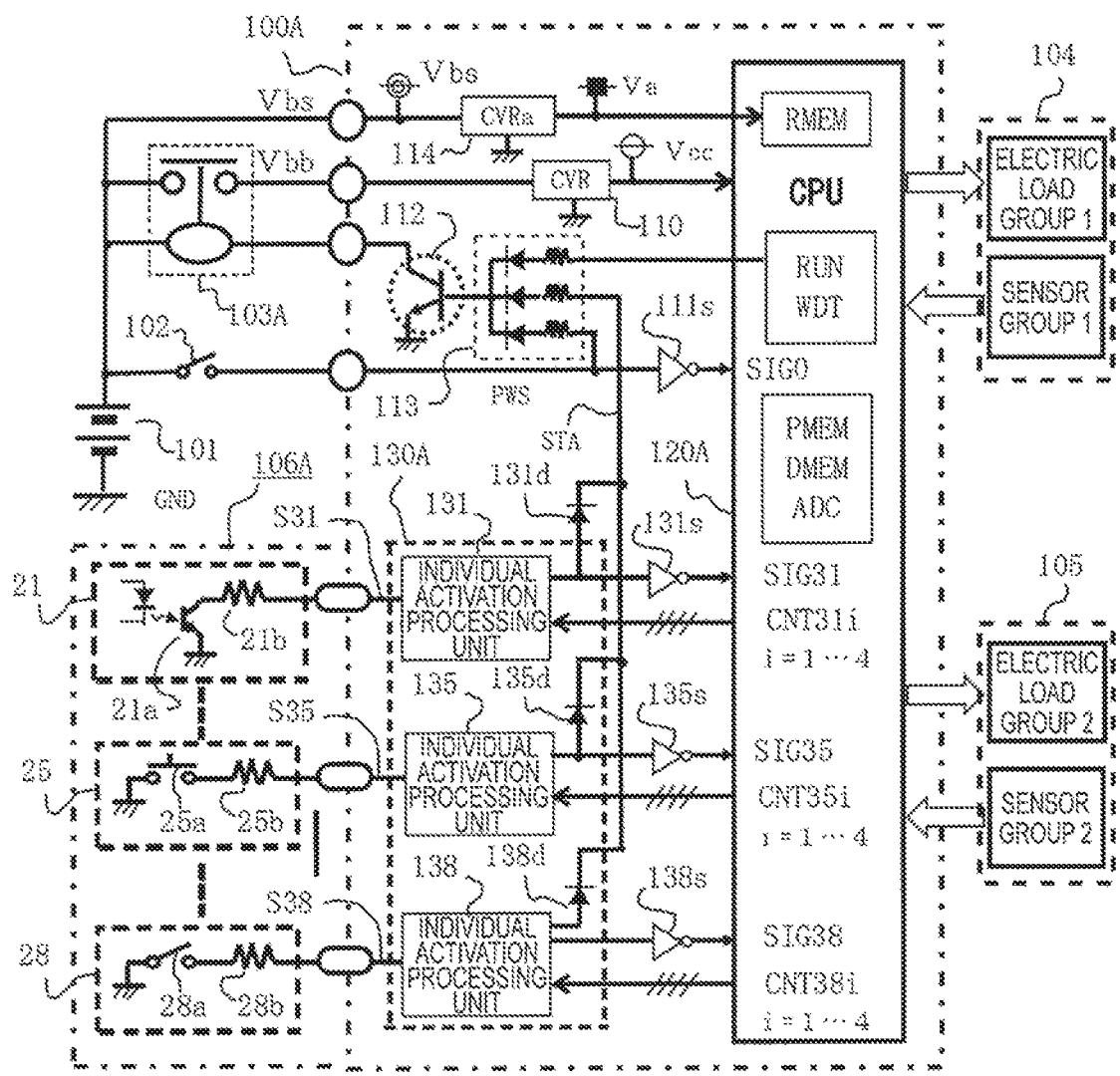
FIG. 1 is an overall circuit block diagram of an in-vehicle electronic control device including an activation signal processing unit according to a first embodiment of the present invention.

Detailed Description of First Embodiment (1) Detailed Description of Configuration A detailed description is now given of a configuration of FIG. 1, which is an overall circuit block diagram of an in-vehicle electronic control device including an activation signal processing unit according to a first embodiment of the present invention.

In FIG. 1, an in-vehicle battery voltage Vbs is applied from an in-vehicle battery 101 of, for example, a DC-12 V system to the in-vehicle electronic control device 100A. A drive power supply voltage Vbb is applied through a power supply relay 103A, which is energized when a power supply switch 102 is closed. Moreover, a main electronic apparatus 104 controlled to drive when the power supply switch 102 is closed is connected to the in-vehicle electronic control device 100A. The main electric apparatus 104 is formed of an electric load group 1 and a sensor group 1.

An auxiliary electronic apparatus 105 controlled to drive when the power supply switch 102 is opened is further connected to the in-vehicle electronic control device 100A. The auxiliary electronic apparatus 105 is formed of an electric load group 2 and a sensor group 2.

An activation auxiliary signal group 106A connected to an inside or an outside of the in-vehicle electronic control device 100A is formed of auxiliary activation command circuits 21 to 28 (hereinafter sometimes referred to as "$2n$", and the same holds true hereinafter) formed by mutually connecting, in series, activation command elements $21a$ to $28a$ (hereinafter sometimes referred to as "$2na$") and short-to-power current limiting resistors $21b$ to $28b$ (hereinafter sometimes referred to as "$2nb$"), and each configured to generate an activation command signal $S3n$.

A part of the activation command elements $2na$ are configured to generate the activation command signal $S3n$, which is uncertain and short, and are represented by push button switches, and the other parts thereof are configured to generate the activation command signal $S3n$, which is uncertain and long, and are represented by toggle switches or push/pull switches to be changed to a closed state or an opened state by a manual operation. The short-to-power current limiting resistor $2nb$ is intended for protection from a short circuit when the activation command element $2na$ is in contact with a power line on a positive side.

Moreover, the number of the auxiliary activation command circuits $2n$ is not limited to eight, and is increased or decreased in accordance with a scale of the entire system.

The in-vehicle electronic control device 100A mainly includes an arithmetic control unit 120A including a main CPU, which is a microprocessor, and an activation signal processing unit 130A.

A stabilized power supply 110 configured to generate a stabilized voltage Vcc, which is, for example, DC 5 V, from the drive power supply voltage Vbb is connected to the arithmetic control unit 120A. The arithmetic control unit 120A includes a main CPU, a nonvolatile program memory PMEM and a data memory DMEM, a volatile RAM memory RMEM, and a multi-channel AD converter ADC. The main CPU operates when the power supply relay 103A is energized. The arithmetic control unit 120A is configured to cooperate with a watchdog timer WDT so as to generate a normal operation signal RUN during a normal operation.

Moreover, when the power supply switch 102 is closed, the power supply relay 103A is energized through a drive signal composition circuit 113 and a power supply relay drive element 112. When the main CPU is consequently activated, and the normal operation signal RUN is generated, the operation of the main CPU continues through the drive signal composition circuit 113 and the power supply relay drive element 112 even when the power supply switch 102 is opened. The control operation is completed by executing predetermined stop processing so as to stop the normal operation signal RUN.

A backup power supply 114 configured to generate a backup voltage Va, which is, for example, DC 5 V, from the in-vehicle battery voltage Vbs is connected to the arithmetic control unit 120A. However, important information such as learned information and abnormality occurrence information stored in the RAM memory RMEM during the operation of the main CPU is transferred to and saved in the nonvolatile data memory DMEM in an after-run period immediately after the power supply switch 102 is opened.

Then, the normal operation signal RUN is stopped, and the power supply relay 103A is de-energized.

Meanwhile, when the power supply switch 102 is closed and a power supply switch signal PWS is thus generated, an operation start signal SIG0 is input to the main CPU through an operation start command element $111s$, which is, for example, an NPN transistor, to thereby execute drive control for the main electric apparatus 104.

However, even in a case in which the power supply switch 102 is opened, when the activation signal processing unit 130A generates a composite activation signal STA, the power supply relay 103A is energized through the drive signal composition circuit 113 and the power supply relay drive element 112. When the main CPU is consequently activated, and the normal operation signal RUN is generated, the operation of the main CPU continues through the drive signal composition circuit 113 and the power supply relay drive element 112 even when the composite activation signal STA is stopped. When the drive control for the auxiliary electric apparatus 105 is completed as a result, the auxiliary control operation is completed by executing predetermined stop processing so as to stop the normal operation signal RUN.

A plurality of individual activation processing units $13n$ (n=1 to 8) forming the activation signal processing unit 130A are configured to generate the composite activation signal STA through individual activation elements $13nd$ in response to the activation command signals $S3n$ generated by the activation command elements $2na$, and to generate individual activation signals $SIG3n$ directed to the main CPU through individual buffer elements $13ns$, which are, for example, NPN transistors. The main CPU is configured to execute drive control for the auxiliary electric apparatus 105 in accordance with the activation command elements $2na$ provided for respective activation factors.

The main CPU is configured to individually or simultaneously generate a latch clear command $CNT3n1$, an activation signal cutoff command $CNT3n2$, a cutoff state release command $CNT3n3$, and an abnormality diagnosis command $CNT3n4$ to the individual activation processing unit $13n$. A detailed description thereof is given later with reference to FIG. 2A and FIG. 2B.

Figure 2A:
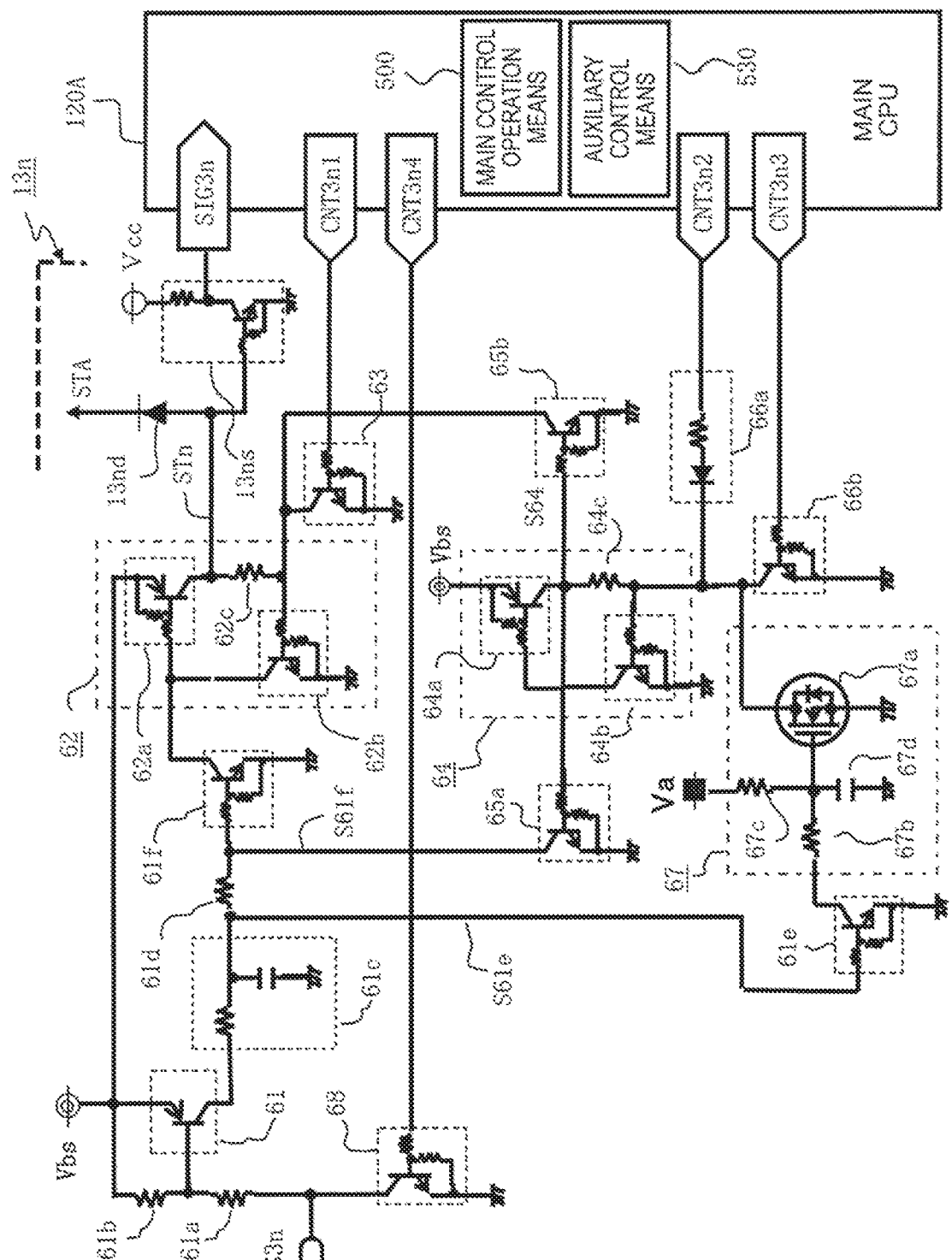
FIG. 2A is a detailed circuit diagram of a general example relating to an individual activation processing unit of FIG. 1.

A detailed description is now given of configurations illustrated in FIG. 2A, which is a detailed circuit diagram of a general example relating to the individual activation processing unit of FIG. 1, and FIG. 26, which is a detailed circuit diagram of a special example relating to the individual activation processing unit of FIG. 1.

Figure 2B:
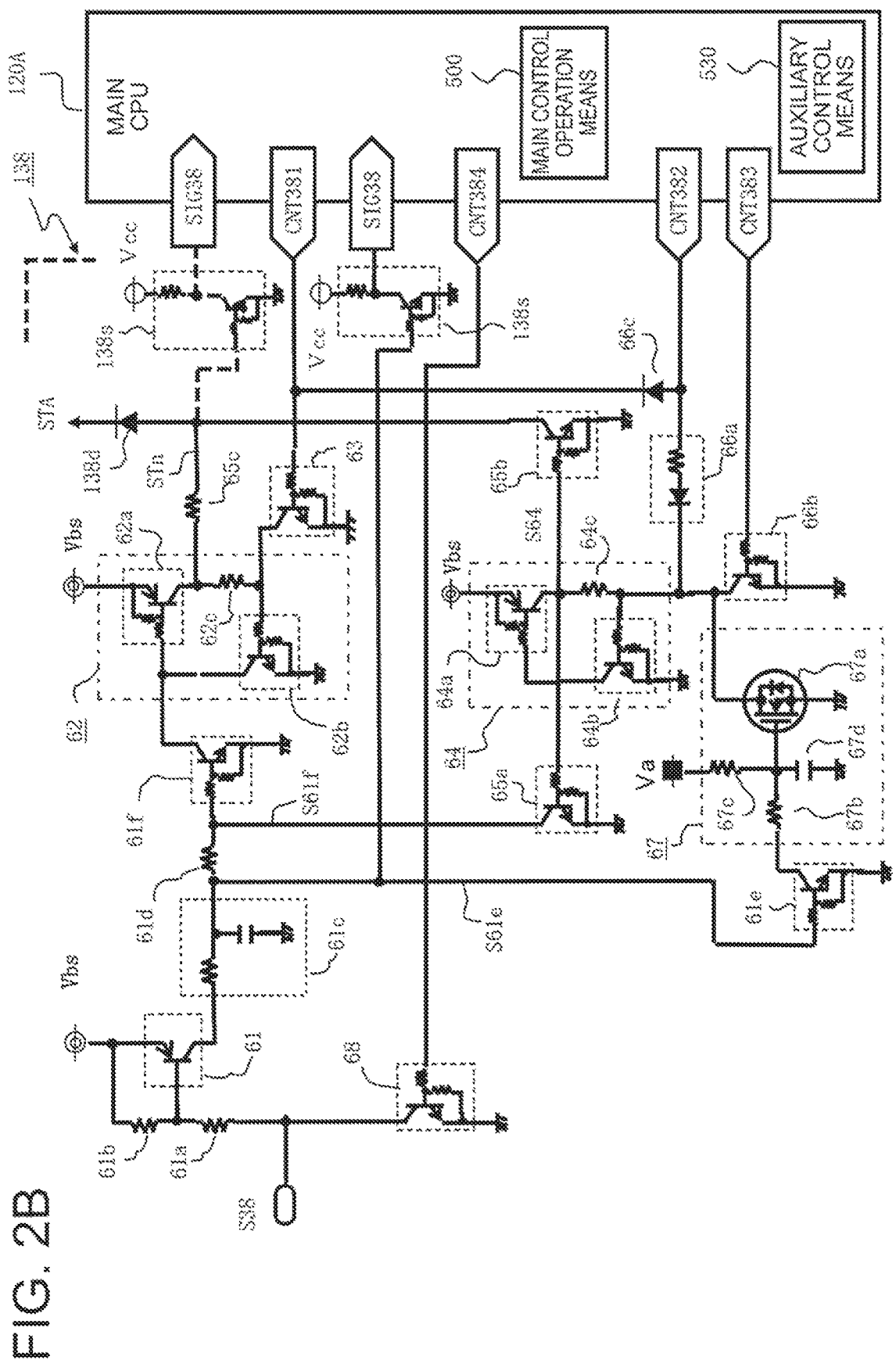
FIG. 2B is a detailed circuit diagram of a special example relating to the individual activation processing unit of FIG. 1.

FIG. 2A is a configuration diagram of the individual activation processing unit $13n$ applicable to, for example, any one of a case in which the activation command element $2na$ is, for example, a push button switch for executing an uncertain short-period closing operation and a case in which the activation command element $2na$ is, for example, a toggle switch for executing an uncertain long-period opening/closing operation. FIG. 2B is a configuration diagram of the individual activation processing unit $13n$ suitable for the case in which the uncertain long-period opening/closing operation is executed.

First, in FIG. 2A, the individual activation processing unit $13n$ is configured to operate through use of the in-vehicle battery voltage Vbs and the backup voltage Va. Currents flowing through four transistors represented as PNP transistors and one field effect transistor out of a plurality of transistors used in this case are standby currents that also flow when the vehicle is in a parking state.

An input element 61 to be supplied with power from the in-vehicle battery voltage Vbs is the PNP transistor to be driven so as to be in a conductive state through a base resistor 61a when a logic level of the activation command signal S3n is "L", to thereby drive to close a first activation element 61e through a filter circuit 61c, and drive to close a second activation element 61f through a serial resistor 61d. An opening stabilizing resistor 61b is connected between an emitter terminal and a base terminal of the transistor.

Even when the logic level of the activation command signal S3n is "H", the input element 61 can be driven so as to be closed by a forcible closing element 68. The forcible closing element 68 is configured to be able to tentatively be opened/closed by an abnormality diagnosis command CNT3n4, which is generated by the main CPU included in the arithmetic control unit 120A.

Moreover, the filter circuit 61c formed of a resistor and a capacitor is used to prevent noise malfunctions of the first activation element 61e and the second activation element 61f.

A first cooperation element 62a to be supplied with power from the in-vehicle battery voltage Vbs is driven so as to be closed by the second activation element 61f, to thereby drive to close a second cooperation element 62b via a cooperation resistor 62c. The second cooperation element 62b drives to close the first cooperation element 62a. As a result, an activation latch unit 62 is formed as a whole.

Moreover, an output voltage from the first cooperation element 62a forms a composite activation signal STn, and is coupled so as to form a logical OR via a diode serving as the individual activation element 13nd, to thereby generate the composite activation signal STA. Further, the output voltage is input as an individual activation signal SIG3n to the main CPU through an individual buffer element 13ns, which is an NPN transistor. The individual activation signal SIG3n is connected to the stabilized voltage Vcc through a pullup resistor.

Meanwhile, a clear command element 63 connected between a base terminal and an emitter terminal of the second cooperation element 62b in order to cut off the conduction thereof is controlled to be in a conductive state by the latch clear command CNT3n1 generated by the main CPU so that a stored state of the activation latch unit 62 is deleted. However, in a case in which the second activation element 61f is closed, the activation latch unit 62 is formed as a set preferential type so that the closed state of the first cooperation element 62a is maintained even when the clear command element 63 is closed.

The first cooperation element 64a to be supplied with power from the in-vehicle battery voltage Vbs is driven so as to be closed by the second cooperation element 64b, to thereby generate a continuous latch cutoff signal S64 so as to maintain the closed state of the second cooperation element 64b through a cooperation resistor 64c. As a result, a cutoff latch unit 64 is formed as a whole.

Moreover, a pre-stage signal cutoff element 65a to be driven so as to be closed by the first cooperation element 64a cuts off the second activation element 61f. A post-stage signal cutoff element 65b to be driven so as to be closed by the first cooperation element 64a cuts off the second cooperation element 62b. As a result, the first cooperation element 62a is opened.

The second cooperation element 64b is configured to be supplied with a current so as to be driven through an activation signal cutoff resistor 66a by an activation signal cutoff command CNT3n2 generated by the main CPU, and to be cut off from the current supply through a cutoff state release element 66b by a cutoff state release command CNT3n3 generated by the main CPU.

Meanwhile, an opening determination element 67a, which is a field effect transistor connected in parallel to the cutoff state release element 66b, forms a recovery determination unit 67. When the activation command signal S3n is generated (logic level thereof is L) so that the input element 61 and the first activation element 61e are closed, a gate electric potential of the opening determination element 67a decreases through a closed-time cutoff resistor 67b so that the opening determination element 67a maintains the opened state.

However, when the activation command signal S3n is stopped (logic level thereof is H), and the input element 61 and the first activation element 61e are opened, the opening determination element 67a is driven so as to be closed from the backup voltage Va through an open-time drive resistor 67c. Consequently, the cutoff latch unit 64 is opened, and as a result, the cutoff state of the activation latch unit 62 is released.

A capacitor 67d for preventing a malfunction due to a noise voltage is connected to a gate terminal of the open-time drive resistor 67c.

A description is now given of the configuration of the individual activation processing unit 138 (example of n=8) illustrated in FIG. 2B with a focus on differences from FIG. 2A.

In FIG. 2B, an individual activation signal SIG38 is input from an output portion of the filter circuit 61c to the main CPU through an individual buffer element 138s in place of the position of the dotted line of FIG. 2A, whereas a connection position of the post-stage signal cutoff element 65b is connected to a connection point between a serial resistor 65c added to an output circuit of the first cooperation element 62a and an individual activation element 138d.

As a result, the main CPU can always monitor the logic state of the activation command signal S38 independently of the operation state of the activation latch unit 62.

When the activation command element 28a is, for example, a push button switch, and a depression operation period thereof is equal to or shorter than a period required to activate the main CPU (for example, 0.5 second), the main CPU cannot recognize which of the plurality of the activation command elements 2na has been closed, and the circuit configuration of FIG. 2B is suitable for a case in which the activation command elements 2na execute closing and opening operations for a relatively long period.

Moreover, an activation signal cutoff command CNT382 to be generated by the main CPU is configured to drive the clear command element 63 through a cooperation diode 66c.

Thus, when the pre-stage signal cutoff element 65a and the post-stage signal cutoff element 65b are closed by the activation signal cutoff command CNT382, the activation latch unit 62 is reset by the clear command element 63, to thereby open the first cooperation element 62a.

When the main CPU generates the latch clear command 381 simultaneously with the generation of the activation signal cutoff command 382 by the main CPU, the drive circuit formed of the cooperation diode 66c for the clear command element 63 is not required.

(2) Detailed Description of Actions and Operations

A detailed description is now given of actions and operations of the in-vehicle electronic control device 100A including the activation signal processing unit 130A according to the first embodiment of the present invention, which is configured as illustrated in FIG. 1, FIG. 2A, and FIG. 2B.

First, in FIG. 1, when the power supply switch 102 for the vehicle drive is closed, the power supply relay 103A is energized through the drive signal composition circuit 113 and the power supply relay drive element 112. The drive power supply voltage Vbb by the in-vehicle battery 101 is thus applied to the in-vehicle electronic control device 100A through an output contact of the power supply relay 103A, and the stabilized voltage Vcc is applied to the main CPU forming the arithmetic control unit 120A through the stabilized power supply 110.

The in-vehicle battery voltage Vbs, which is the output voltage of the in-vehicle battery 101 itself, is also input to the in-vehicle electronic control device 100A. The backup voltage Va is always generated through the backup power supply 114, to thereby maintain information stored in the RAM memory RMEM, which is the volatile memory included in the main CPU.

The main CPU applied with the stabilized voltage Vcc is configured to execute an internal inspection including the cooperating nonvolatile program memory PMEM and data memory DMEM, and then, cooperate with the watchdog timer WDT so as to generate the normal operation signal RUN, to thereby execute a self-hold operation for the power supply relay 103A through the drive signal composition circuit 113, and execute the drive control for the main electric apparatus 104, which is a main electric load, while monitoring an operation start signal SIG0.

Further, when the power supply switch 102 is opened, and the operation start signal SIG0 is thus stopped, an after-run including saving processing of transferring information on main current values contained in the RAM memory to the nonvolatile data memory DMEM is executed, and a watchdog signal is then stopped. Consequently, the normal operation signal RUN is stopped, and the power supply relay 103A is de-energized to be opened.

However, as described above, even when the power supply switch 102 is opened, when the activation signal processing unit 130A generates the composite activation signal STA, the power supply relay 103A is energized through the drive signal composition circuit 113 and the power supply relay drive element 112. When the main CPU is consequently activated, and the normal operation signal RUN is generated, the operation of the main CPU continues through the drive signal composition circuit 113 and the power supply relay drive element 112 even when the composite activation signal STA is stopped. When the drive control for the auxiliary electric apparatus 105 is completed as a result, the auxiliary control operation is completed by executing the predetermined stop processing so as to stop the normal operation signal RUN. The detailed configuration of the individual activation processing unit 13n forming the activation signal processing unit 130A is as described above with reference to FIG. 2A and FIG. 2B.

Figure 3A:
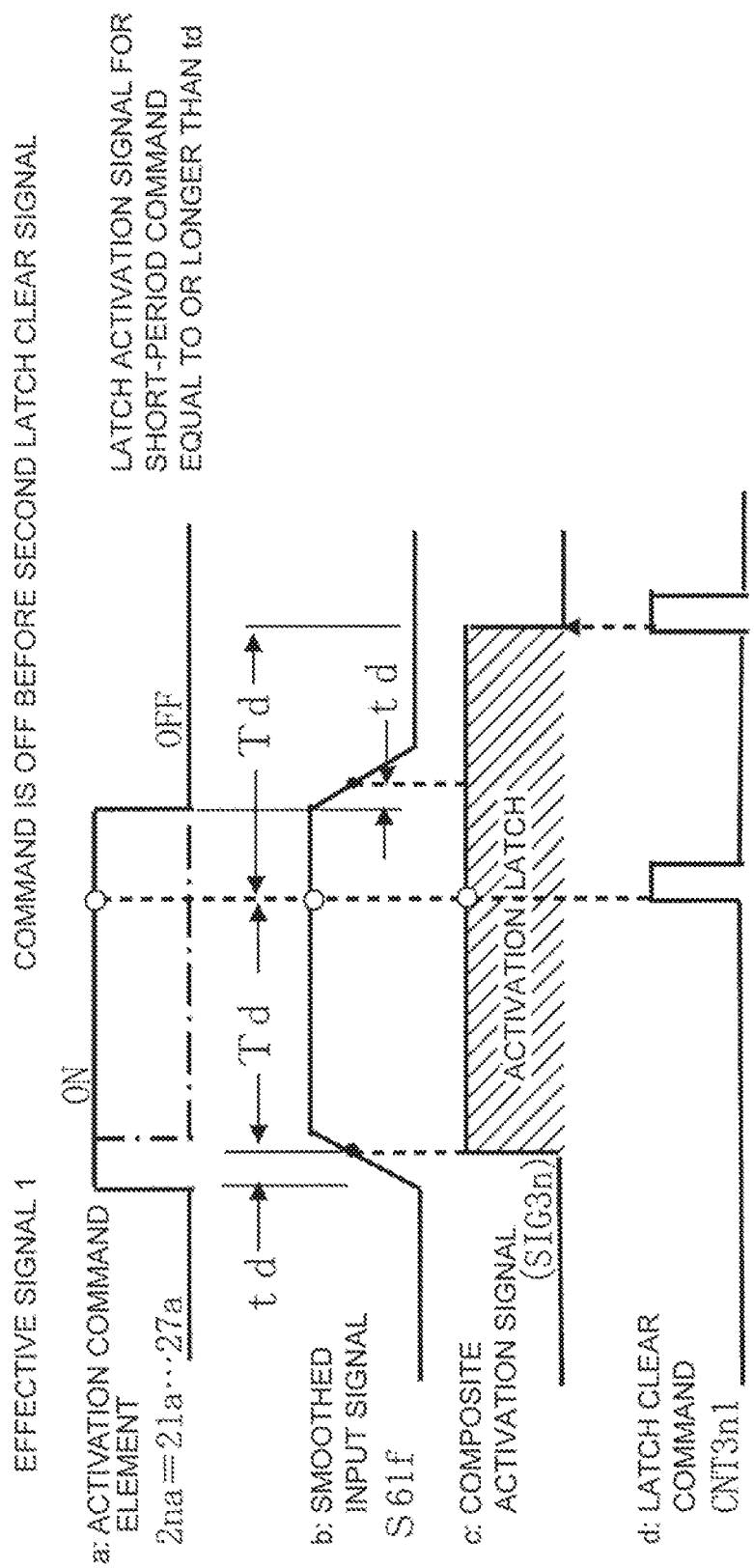
FIG. 3A is a first example chart of a time chart for illustrating an operation of FIG. 2A.

A detailed description is now given of FIG. 3A, which is a first example chart of a time chart for illustrating an operation of FIG. 2A, and FIG. 3B, which is a second example chart of the time chart.

In FIG. 3A, a time chart in a row "a" in a top portion indicates the opened (OFF) and closed (ON) states of the activation command element 2na in the auxiliary activation command circuit 2n (n=1 to 8). A time chart in a row "b" in a middle portion indicates a waveform of a post-stage smoothed input signal S61f, which is an output signal of the filter circuit 61c. A time chart in a row "c" in the middle portion indicates a waveform of an activation latch signal indicating an operation state of the composite activation signal STA responding to the output signal of the activation latch unit 62 and the individual activation signal SIG3n, which is a logically inverted signal thereof.

Thus, it is indicated that the activation latch waveform is generated at a time point delayed from an operation waveform of the activation command element 2na by a delay response period td (for example, 5 milliseconds) defined by a filter constant of the filter circuit 61c, and that the activation latch unit 62 recognizes that the activation command element 2na is closed based on a fact that an ON period width of the activation command element 2na is equal to or longer than the delay response period td. Meanwhile, a time chart in a row "d" in a bottom portion indicates a pulse signal by the latch clear command CNT3n1 periodically generated by the main CPU at a predetermined clear pulse generation cycle Td (for example, 100 milliseconds).

Moreover, in the first example of FIG. 3A, a case in which the ON period width of the activation command element 2na is equal to or longer than td+Td and is shorter than td+2Td is illustrated. As a result, the composite activation signal STA is stopped at a time point at which the second latch clear command CNT3n1 is generated.

Meanwhile, in the second example of FIG. 3B, a case in which the activation command element 2na does not turn OFF even after the latch clear command CNT3n1 is generated, for example, N=10 times (one second) or more is illustrated. In this case, the main CPU is configured to determine that the activation command element 2na has a short-circuit abnormality.

However, when the activation command element 2na is a toggle switch, and a closed state for a long period is thus generated, the main CPU determines that the activation command element 2na has a contact failure based on a fact that the activation command element 2na changes from ON to OFF while the latch clear command CNT3n1 is generated, for example, N=10 times (one second) or more.

The above-mentioned number N for the determination can appropriately be set to a different value in accordance with a characteristic of the individual activation command element 2na, and each of the set values is stored and saved in advance in the nonvolatile program memory PMEM or the data memory DMEM.

A detailed description is now given of FIG. 4A, which is a third example chart of the time chart for illustrating the operation of FIG. 2A, and FIG. 46, which is a fourth example chart of the time chart for illustrating the operation of FIG. 2B.

In FIG. 4A, out of a row "a" to a row "d" in a top portion, the row "a" indicates the opened/closed state of the activation command element 2na, the row "b" indicates a waveform of the smoothed input signal S61f, the row "c" indicates the composite activation signal STA, and the row "d" indicates a generation state of the latch clear command CNT3n1, as in FIG. 3A. A row "j" indicates a generation state of the individual activation signal SIG3n, which is the logically inverted signal of the composite activation signal STA.

Moreover, in this example, at a time point at which the latch clear command CNT3n1 have been generated three times, the activation signal cutoff command CNT3n2 indicated in a row "e" in a middle portion is generated, to thereby drive the pre-stage signal cutoff element 65a and the post-stage signal cutoff element 65b of FIG. 2A to be closed so that the composite activation signal STA in the row "c" and the individual activation signal SIG3n in the row "j" are released even when the activation command element 2na in the row "a" is in the closed state.

The continuous latch cutoff signal S64 in a row "f" in a bottom portion is an output signal of the cutoff latch unit 64 of FIG. 2A, and the logic level thereof is "H" as a result of the generation of the activation signal cutoff command CNT3n2 in the previous row "e".

A pre-stage smoothed input signal S61e in a row "g" in the bottom portion is a voltage signal immediately after the filter circuit 61c of FIG. 2A, and the pre-stage smoothed input signal S61e is slightly attenuated even when the pre-stage signal cutoff element 65a is closed compared with the smoothed input signal S61f in the row "b" in the top portion due to a difference as to whether or not the serial resistor 61d is interposed.

Moreover, when the activation command element 2na in the row "a" in the top portion is opened (OFF), the input element 61 and the first activation element 61e of FIG. 2A are opened, and the opening determination element 67a of the recovery determination unit 67 changes from the opened state to the closed state.

As a result, when the cutoff latch unit 64 is reset to return to the normal state, and the activation command element 2na is closed (ON) in a right side portion of the row "a" in the top portion, the activation latch signal SIG3n in the row "c" is generated.

In FIG. 4B, which is the time chart corresponding to FIG. 2B, differences from the case of FIG. 4A, which is the time chart corresponding to 2A, are as follows.

The individual activation signal SIG38 (example of n=8) of FIG. 2B is a signal obtained by the individual buffer element 138s logically converting the pre-stage smoothed input signal S61e, which is the output signal of the filter circuit 61c. An output waveform thereof is obtained by obtaining a waveform delayed by the response delay period td by the filter circuit 61c from the waveform of the activation command element 28a in the row "a" in the uppermost portion, and logically converting the delayed waveform by the individual buffer element 138s as indicated in the row "j" of the lowermost portion of FIG. 4B.

Thus, the individual activation signal SIG38 obtained in this state is not influenced by operation states of the activation latch unit 62 and the cutoff latch unit 64. However, the composite activation signal STA is the same as that in the case of FIG. 4A.

Figure 5B:
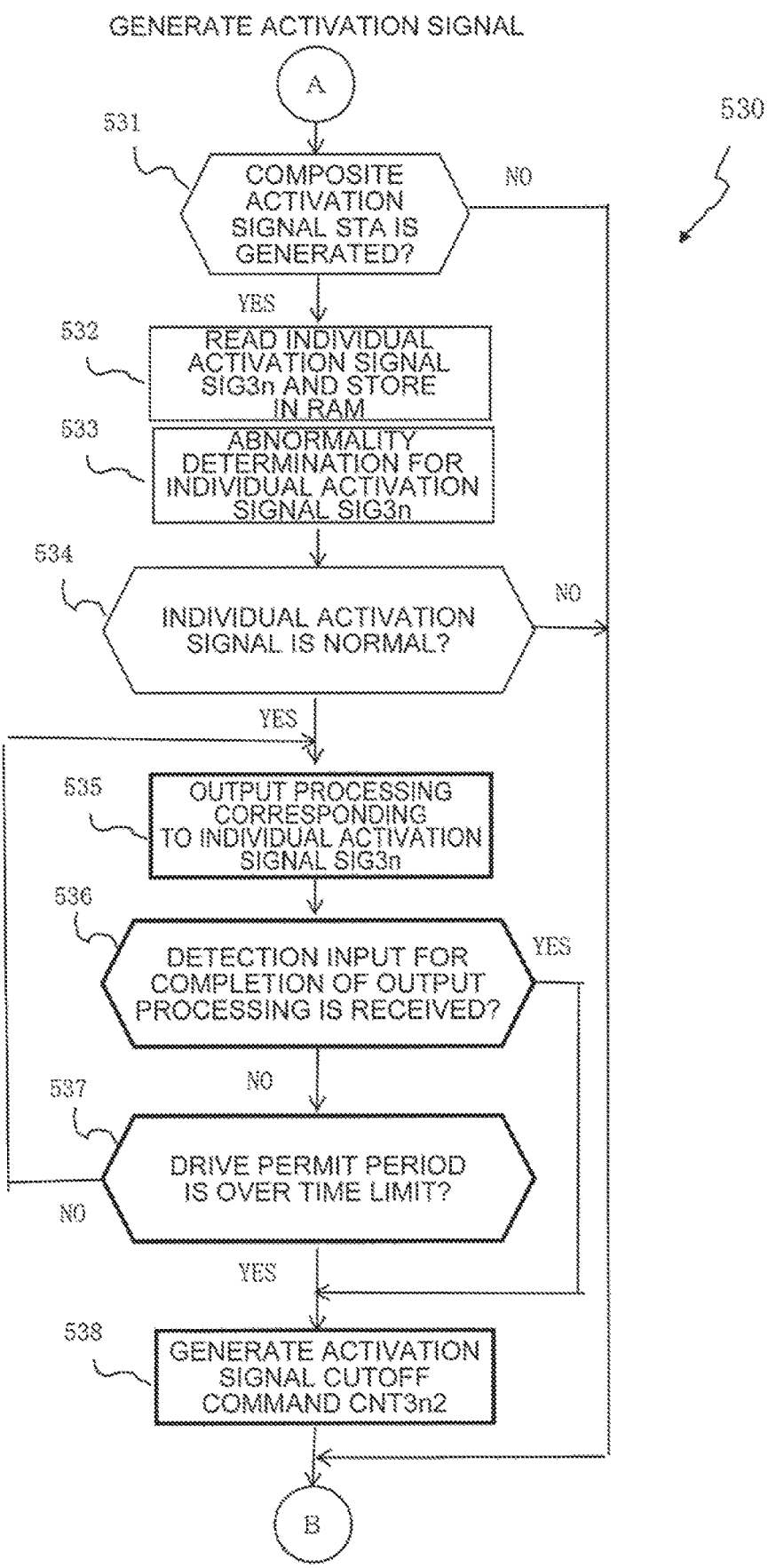
FIG. 5B is a flowchart for illustrating an operation relating to auxiliary control operation means of FIG. 1.

A detailed description is now given of FIG. 5A, which is a flowchart for illustrating an operation relating to main control operation means of FIG. 1, and FIG. 5B, which is a flowchart for illustrating an operation relating to auxiliary control operation means of FIG. 1. The each means may be constructed by dedicated hardware(s), central processing unit(s) or nodule(s). The same applies hereinafter.

In FIG. 5A, Step 501 as a preliminary step is a step in which the power supply switch 102 is closed so as to generate the power supply switch signal PWS, or the activation signal processing unit 130A generates the composite activation signal STA. The next Step 502 as a preliminary step is a step in which the power supply relay 103A is energized through the drive signal composition circuit 113 and the power supply relay drive element 112, the drive power supply voltage Vbb is applied to the in-vehicle electronic control device 100A, and the stabilized power supply 110 supplies the stabilized voltage Vcc to the arithmetic control unit 120A.

The next Step 510 is a step in which the main CPU forming a main portion of the arithmetic control unit 120A starts the generation of the watchdog signal and the control operation.

The next Step 511 is a step in which the generation state of the watchdog signal is monitored by the watchdog timer WDT (not shown), and when the generation state is normal, the watchdog timer WDT generates the normal operation signal RUN.

The next Step 512 is a determination step in which it is determined whether or not the power supply switch 102 is closed in accordance with the operation start signal SIG0, and when the power supply switch 102 is closed, a determination of "YES" is made, and the operation proceeds to S513, which is a step block, whereas when the power supply switch 102 is not closed, a determination of "NO" is made, and the operation proceeds to Step 531 of FIG. 5B through a connector A.

Step 513 as the step block is a step in which a sum check or a parity check relating to the program memory PMEM, the data memory DMEM, and the RAM memory RMEM for the calculation processing is executed as an initial inspection, and moreover, it is inspected whether or not an abnormality inconvenient for the driving of the vehicle exists.

The next Step 514 is a determination step in which when an abnormality is found in Step 513 as the step block, a determination of "YES" is made, and the operation proceeds to Step 515, whereas when an abnormality does not exist, a determination of "NO" is made, and the operation proceeds to Step 516, which is a step block.

The main CPU is configured to repeat the control operation at a cycle of, for example, five milliseconds or shorter between Step 510 for starting the operation and Step 519 for finishing the operation described later. The initial inspection executed for the first time in Step 513 as the step block requires a period of, for example, approximately 0.5 second.

Step 515 is a step in which a predetermined procedure, for example, an abnormality notification, is executed, and the operation proceeds to Step 517 within a predetermined period.

Step 516 as the step block is a step in which travel/driving control for the vehicle is executed, and the operation proceeds to Step 517 within a predetermined period.

Step 517 is a determination step in which it is again determined whether or not the power supply switch 102 is closed in the same manner as in Step 512. When the power supply switch 102 is closed, a determination of "YES" is made, and the operation proceeds to Step 519 for finishing the operation, whereas when the power supply switch 102 is not closed, a determination of "NO" is made, and the operation proceeds to Step 520.

In Step 519 for finishing the operation, other control programs are executed to return to Step 510 for starting the operation so that the calculation cycle is equal to or shorter than, for example, 5 milliseconds. The series of steps from Step 510 for starting the operation to Step 519 for finishing the operation corresponds to the main control operation means 500, and Step 511 out thereof corresponds to self-hold means.

Step 520 is a step corresponding to a control stop processing means for executing a function inspection for the activation signal processing unit 130A, and transferring and writing learned data written in the RAM memory during the driving of the vehicle and important data in an abnormality occurrence record to the nonvolatile data memory DMEM or the program memory PMEM.

For the function inspection for the activation signal processing unit 130A in Step 520, the cutoff state release command CNT3n3 directed to the cutoff latch unit 64 and the abnormality diagnosis command CNT3n4 directed to the activation command signal S3n are used so as to execute a preliminary inspection for the activation signal processing unit 130A including the recovery determination unit 67.

The next Step 521 is a step corresponding to self-hold stop means for stopping the watchdog signal so that the watchdog timer stops the normal operation signal RUN.

The next Step 522 is a step in which the power supply to the main CPU is stopped, and the series of control operations is completed.

In FIG. 5B, Step 531 is a determination step in which when the operation proceeds from Step 501 as the preliminary step of FIG. 5A to Step 510 as the initial step due to the generation of the composite activation signal STA, a determination of "YES" is made, and the operation proceeds to Step 532, whereas when the operation proceeds from Step 501 to Step 510 due to the closing of the power supply switch 102, a determination of "NO" is made, and the operation proceeds to Step 520 of FIG. 5A. In short, the determination of "YES" is made in Step 531 under the state in which the operation start signal SIG0 is not generated by the power supply switch 102, whereas the determination of "NO" is made in Step 531 under the state in which the operation start signal SIG0 is generated.

Step 532 is a step in which the operation state of the individual activation signal SIG3n is read, and current information thereon is written and stored in a predetermined address of the RAM memory.

The next Step 533 is a step corresponding to activation signal abnormality determination means for tentatively generating, as described with reference to FIG. 3B, the latch clear command CNT3n1 for a plurality of times, to thereby determine whether or not a short-circuit abnormality or a contact failure of the activation command element 2na exists.

The next Step 534 is a determination step in which when an abnormality determination result obtained in Step 533 is normal, a determination of "YES" is made, and the operation proceeds to Step 535, whereas when the abnormality determination result is abnormal, a determination of "NO" is made, and the operation proceeds to Step 520 of FIG. 5A through a connector B.

Step 535 is a step corresponding to output processing means for executing drive control for the auxiliary electric apparatus 105 corresponding to details of the individual activation signal SIG3n read in Step 532.

The next Step 536 is a determination step in which an input state of a sensor operating as a result of the output processing in Step 535 is monitored, and when a detection input is received, a determination of "YES" is made, and the operation proceeds to Step 583, whereas when the detection input cannot be received, a determination of "NO" is made, and the operation proceeds to Step 537.

Step 537 is a determination step corresponding to elapsed period excess determination means for determining whether or not a predetermined permissible period has elapsed, and when the period has not elapsed, making a determination of "NO" to return to Step 535, whereas when the delay response period exceeds the predetermined value, making a determination of "YES" to proceed to Step 538.

Step 538 is a step corresponding to activation signal cutoff means for generating the activation signal cutoff command CNT3n2 so as to activate the cutoff latch unit 64, to thereby stop the output of the activation latch unit 62 so as to stop the composite activation signal STA.

The series of steps from Step 531 to Step 538 corresponds to the auxiliary control means 530, which proceeds to Step 520 of FIG. 5A through the connector B after Step 538.

(3) Detailed Description of Modification Example

Figure 6:
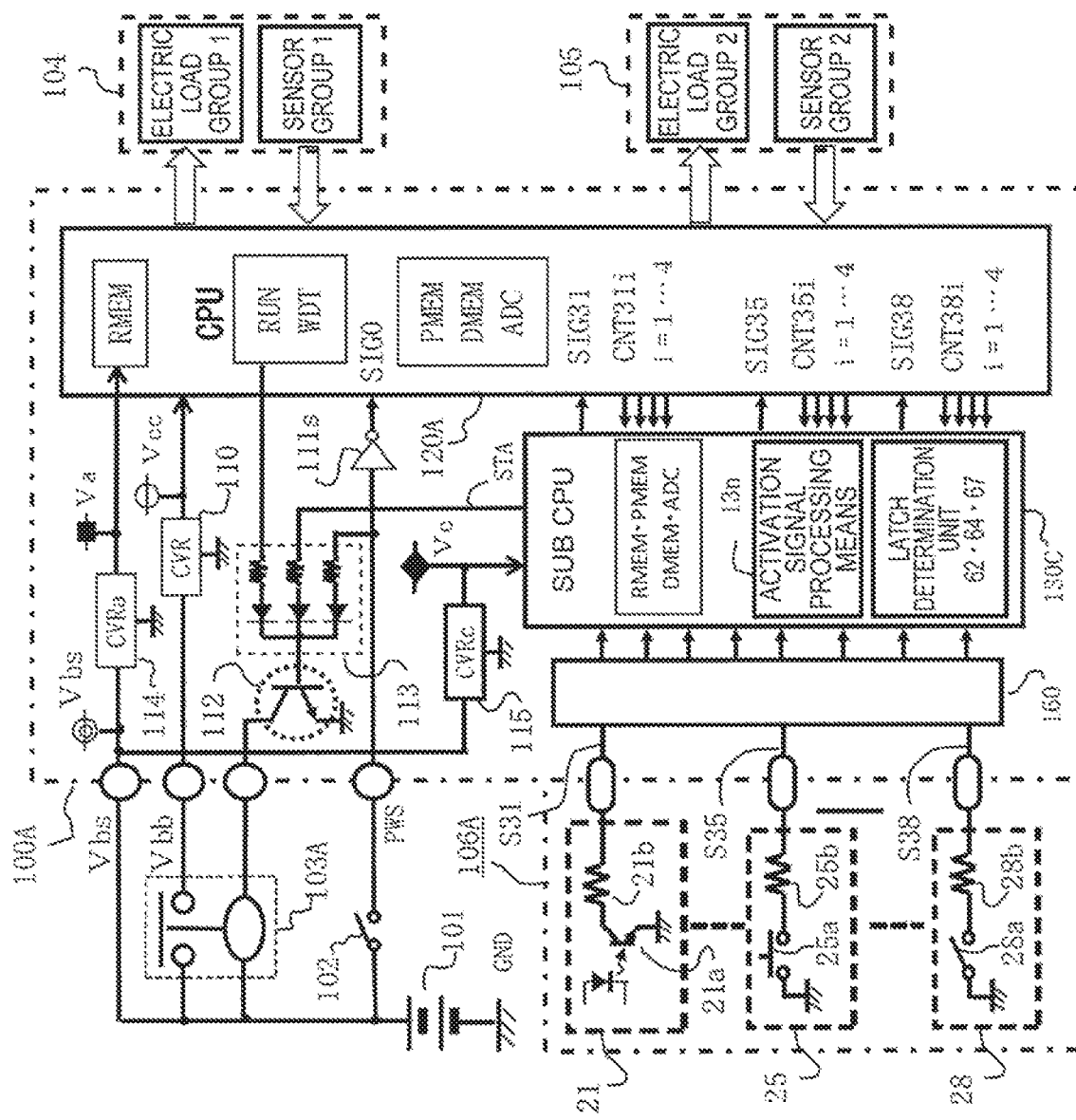
FIG. 6 is an overall circuit block diagram of an in-vehicle electronic control device including an activation signal processing unit according to a modification example of the present invention of FIG. 1.

A detailed description is now given of a configuration and an action and operation of FIG. 6, which is an overall circuit block diagram of the in-vehicle electronic control device including the activation signal processing unit according to a modification example of that of FIG. 1, with a focus on differences from FIG. 1.

In FIG. 6, the same reference symbols as those of FIG. 1 are used for related portions corresponding to FIG. 1. In FIG. 6, the in-vehicle electronic control device 100A configured to be supplied with the power from the in-vehicle battery 101 through the power supply relay 103A to execute drive control for the main electric apparatus 104 and the auxiliary electric apparatus 105 includes an activation signal processing unit 130C provided between the arithmetic control unit 120A and the activation auxiliary signal group 106A.

The activation signal processing unit 130A of FIG. 1 is formed of hardware logic circuits illustrated as the plurality of individual activation processing units 13n in FIG. 2A and FIG. 2B.

However, the activation signal processing unit 130C of FIG. 6 is formed of a sub CPU, which is an auxiliary microprocessor. The individual activation processing unit 13n is an activation signal processing means constructed by a control program using the sub CPU.

Portions corresponding to the filter circuit 61c of FIG. 2A and FIG. 2B are assembled as an input interface circuit 160 in FIG. 6, and are connected between the activation auxiliary signal group 106A and the activation signal processing unit 130C.

Moreover, the activation signal processing unit 130C is supplied with power from an auxiliary voltage Vc generated by an auxiliary control power supply 115 always supplied with power from the in-vehicle battery voltage Vbs, and is configured to generate the composite activation signal STA when any one of the activation command elements 2na (n=1 to 8) is closed, to thereby energize the power supply relay 103A through the drive signal composition circuit 113 and the power supply relay drive element 112 so as to supply power to the arithmetic control unit 120A through the stabilized power supply 110.

As in the case of FIG. 1, the drive signal composition circuit 113 is configured to use the power supply switch signal PWS generated by the power supply switch 102, the composite activation signal STA, and the normal operation signal RUN generated by the watchdog timer WDT so as to energize the power supply relay 103A through the power supply relay drive element 112.

In this modification example, the sub CPU forming the activation signal processing unit 130C is overwhelmingly small in memory capacity of the program memory and low in overall power consumption compared with the main CPU forming the arithmetic control unit 120A, and has a short response delay period at the time of the activation. The sub CPU can thus directly input even the closing signal of a push button switch, which executes closing operation in a short period.

As a result, there can be provided the in-vehicle electronic control device including the activation signal processing unit that has a small standby current even when the power is always supplied to the sub CPU, and is not inferior to the hardware activation signal processing unit 130A.

(4) Gist and Features of First Embodiment and Modification Example Thereof

As is apparent from the above description, the in-vehicle electronic control device 100A including the activation signal processing unit 130A, 130C according to the first embodiment of the present invention and the modification example of the first embodiment includes: the arithmetic control unit 120A configured to execute the control program serving as the main control operation means 500 for starting the control operation through application of the stabilized voltage Vcc from the in-vehicle battery 101 through the power supply relay 103A configured to respond to the closing operation of the power supply switch 102 and the stabilized power supply 110 so that the normal operation signal RUN is generated, maintaining the closing operation of the power supply relay 103A, and monitoring drive control for the main electric apparatus 104 and the reaction state to the drive control, the arithmetic control unit being configured to transfer and save at least a part of the latest current information to the nonvolatile memory when the power supply switch 102 is opened, then stop the normal operation signal RUN, and de-energize and stop the power supply relay 103A; and the activation signal processing unit 130A, 130C configured to execute the control program serving as the auxiliary control means 530 for activating the arithmetic control unit 120A in response to closing operations of the plurality of activation command elements 21a, 22a, . . . , 2na even when the power supply switch 102 is opened, and monitoring drive control for the auxiliary electric apparatus 105, and the reaction state to the drive control.

The activation signal processing units 130A, 130C includes the plurality of individual activation processing units 131, 132, . . . , 13n, to which the activation command signals S31, S32, . . . , S3n each responding to the opened state and the closed state of the activation command element 2na (n=1, 2, . . . , n, the same applies hereinafter) are to be input, respectively.

A part of the plurality of activation command elements 2na are configured to generate the activation command signal S3n, which is uncertain and short in period, and are represented by push button switches, and another part thereof are configured to generate the activation command signal S3n, which is uncertain and long in period, and are represented by any one of toggle switches and push/pull plugs to be changed to any one of a closed state and an opened state by a manual operation.

Further, each of the plurality of individual activation processing units 13n includes the activation latch unit 62 configured to store generation of a corresponding one of the activation command signals S3n, couple the composite activation signals STn, each of which is the output signal from the activation latch unit, to one another so as to form a logical OR, to thereby generate the composite activation signal STA, and generate the individual activation signal SIG3n for individually inputting a generation state of a corresponding one of the activation command signals S3n to the arithmetic control unit 120A.

The arithmetic control unit 120A is configured to: start the control operations when the stabilized voltage Vcc is applied through the power supply relay 103A to be driven so as to be closed in response to the composite activation signal STA, and use the normal operation signal RUN to maintain the operation state of the power supply relay 103A; and read the individual activation signals SIG3n to execute the drive control for the auxiliary electric apparatus 105, and generate the activation signal cutoff command CNT3n2 for stopping the output of the activation latch unit 62 until the generation of the normal operation signal RUN is stopped as a result of any one of the operation confirmation accompanying the drive control and the determination of elapse of the predetermined period.

The individual activation processing unit 13n further includes the cutoff latch unit 64 and the recovery determination unit 67.

The cutoff latch unit 64 is configured to be driven so as to be set by the activation signal cutoff command CNT3n2, and stop the generation of the composite activation signal STn when the plurality of activation command elements 2na are in any one of the normally closed state and the abnormally closed state.

The recovery determination unit 67 is configured to reset the cutoff latch unit 64 when the plurality of activation command elements 2na are in any one of the normally opened state and in the returned-to-opened state, and enable the generation of the composite activation signals STn when the plurality of activation command elements 2na are closed.

The set input signal of the activation latch unit 62 is the post-stage smoothed input signal S61f obtained through the input element 61, to which power is to be supplied so as to drive by the activation command signal S3n, the filter circuit 61c, and the serial resistor 61d.

Irrespective of whether the activation command element 2na executes the uncertain short-period operation or the uncertain long-period operation, the individual activation signal SIG3n is obtained by the individual buffer element 13ns applying logic conversion to the composite activation signal STn, to thereby change the system voltage.

Alternatively, when the activation command element 2na executes the uncertain long-period operation, and is able to stably generate the composite activation signal STn without intermediation of the activation latch unit 62, the individual activation signal SIG3n is obtained by the individual buffer element 13ns applying logic conversion to the pre-stage smoothed input signal S61e, which is the output signal from the filter circuit 61c, to thereby change the system voltage.

The arithmetic control unit 120A includes, as a part of the auxiliary control means 530, the activation signal abnormality determination means, which is the control program configured to generate, in one of an individual manner and a simultaneous manner, the latch clear command CNT3n1 directed to the activation latch unit 62 arranged for each of the plurality of individual activation processing units 13n.

The activation latch unit 62 is the storage unit of a set preferential type, which is configured to generate and store the composite activation signal STn when the activation command element 2na is closed, and maintain the generation state of the composite activation signal STn even when the activation command element 2na is subsequently opened, and in which the storage of the composite activation signal STn is reset when the latch clear command CNT3n1 is generated, but the composite activation signal STn maintains the generation state when the activation command element 2na continues to be closed.

Further, the activation signal abnormality determination means is configured to use the individual activation signal SIG3n generated when the latch clear command CNT3n1 directed to the activation latch unit 62 is intermittently generated so as to monitor the opened state and the closed state of the activation command element $2na$.

When the activation command element $2na$ generates the uncertain short-period closing signal, and the individual activation signal SIGn detects the closed state of the activation command element $2na$ during the period of generation of a predetermined number of times of the latch clear command CNT$3n1$, the activation command element $2na$ is determined to have a short-circuit abnormality.

When the activation command element $2na$ generates an uncertain long-period closing signal, the individual activation signal SIGn once detects the closed state of the activation command element $2na$, and the activation command element $2na$ subsequently changes to the opened state during a predetermined period in the period of generation of the predetermined number of times of the latch clear command CNT$3n1$, the activation command element $2na$ is determined to have the disconnection abnormality.

As described above, according to a second aspect of the present invention, the arithmetic control unit is configured to generate the latch clear command directed to the activation latch unit, which is the storage unit of a set preferential type, for a plurality of times, and detect a short circuit abnormality or a disconnection abnormality of the activation command element $2na$ in accordance with the logic state of the individual activation signal SIG$3n$ during the period of the generation of the latch clear command.

Thus, the following feature is provided. The composite activation signal STn and the individual activation signal SIG$3n$ can share and use the output signal of the same activation latch unit, and the abnormality determination period can be adjusted in accordance with the number of times of the generation of the latch clear command.

Moreover, the following feature is provided. When the individual activation signal SIG$3n$ is obtained from the smoothed input signal, which is the input signal to the activation latch unit, the opened/closed state of the activation command element $2na$ can be monitored independently of the action state of the activation latch unit.

The cutoff latch unit $64$ is configured to, when the activation signal cutoff command CNT$3n2$ is generated, drive to close the pre-stage signal cutoff element $65a$ and the post-stage signal cutoff element $65b$, which are configured to cut off any one of the set input and the reset input of the activation latch unit $62$, and the composite activation signal STn, to thereby stop the composite activation signal STn.

The recovery determination unit $67$ includes the opening determination element $67a$, which is a field effect transistor for resetting the cutoff latch unit $64$, and the opening determination element $67a$ is configured to be brought into a conductive state to be cut off by the first activation element $61e$, which is brought into a conductive state when the activation command signal S$3n$ is generated, and is brought into a conductive state to be closed by application of the gate voltage by the open-time drive resistor $67c$ when the activation command signal S$3n$ is stopped so that the first activation element $61e$ is opened.

As the gate voltage, the backup voltage Va, which is a stabilized voltage generated by the backup power supply $114$, to which power is always supplied from the in-vehicle battery $101$, is applied.

As described above, according to a third aspect of the present invention, the cutoff latch state of the cutoff latch unit configured to reset the activation latch unit, which has stored the generation of the activation command signal S$3n$, is released by the recovery determination unit including the field effect transistor when the activation command signal S$3n$ is released. When the activation command signal S$3n$ is newly generated, the activation latch unit in the reset state stores and hold the generation. The cutoff latch unit and the recovery determination unit are arranged for each of the plurality of the activation signal processing units.

Thus, the following feature is provided. When a specific activation command element $2na$ is once closed, the arithmetic control unit executes the activation processing control in response to this closing and then stops the operation, and the power supply relay is thus cut off, thereby saving the power. When this specific activation command element $2na$ is abnormally closed or continuously closed, reactivation is inhibited by the cutoff latch unit that consumes low power. The reactivation can be executed by the specific activation command element $2na$ being closed again after once opened, and even when the specific command element $2na$ is continuously closed, the activation processing control by other activation command element $2na$ can be executed at any time.

The arithmetic control unit $120A$ includes control the stop processing means, which is the control program to be executed when the power supply switch $102$ is opened, as a part of the main control operation means $500$, and the control stop processing means is configured to generate the cutoff state release command CNT$3n3$ and the abnormality diagnosis command CNT$3n4$ for executing diagnosis for the component included in the individual activation processing units $13n$.

The abnormality diagnosis command CNT$3n4$ is configured to apply opening and closing control, in one of an individual manner and a simultaneous manner, to the forcible closing element $68$ connected in parallel to the activation command element $2na$ under a normal state in which the activation command element $2na$ is not executing the closing operation, and cooperate with the latch clear command CNT$3n1$ so as to monitor a behavior of the activation latch unit $62$, to thereby inspect whether or not an appropriate individual activation signal SIG$3n$ is generated.

The cutoff state release command CNT$3n3$ is configured to drive, in one of an individual manner and a simultaneous manner, the cutoff state release element $66b$ configured to reset the cutoff latch unit $64$ driven to be set by the activation signal cutoff command CNT$3n2$ to inspect the release state of the cutoff latch unit $64$ through use of the abnormality diagnosis command CNT$3n4$ and the individual activation signal SIG$3n$, and to inspect, based on the generation and stop of the abnormality diagnosis command CNT$3n4$, whether or not the cutoff latch unit $64$ driven to be set by the activation signal cutoff command CNT$3n2$ is to be released by the recovery determination unit $67$.

As described above, according to a fourth aspect of the present invention, the internal inspection for the activation signal processing unit is executed immediately after the power supply switch is turned off following the main control operation in which the power supply switch is closed.

Thus, the following feature is provided. The inspection operation for the activation signal processing unit can be completed with a margin before the auxiliary control is executed by the activation command element $2na$, and an external inspection relating to the activation command element $2na$ itself can accurately be executed based on the normal activation signal processing unit when the execution of the auxiliary control is started.

The activation signal processing unit $130C$ includes the auxiliary microprocessor SCPU, and to which power is to be supplied from the auxiliary control power supply $115$, to which power is always supplied from the in-vehicle battery 101 to generate the auxiliary voltage Vc.

The input interface circuit 160, which is a filter circuit, is provided between the activation auxiliary signal group 106A including the plurality of auxiliary activation command circuits 2n and the auxiliary microprocessor SCPU.

The auxiliary microprocessor SCPU forms the plurality of the individual activation processing units 13n, the individual activation processing units 13n contains the control program forming the activation latch unit 62, the cutoff latch unit 64, and the recovery determination unit 67, and each of the plurality of individual activation processing units 13n is configured to generate the composite activation signal STn, to thereby energize the power supply relay 103A through use of the composite activation signal STA.

Each of the plurality of individual activation processing units 13n is further configured to generate the individual activation signal SIG3n directed to each of the arithmetic control unit 120A, and receive from the arithmetic control unit 120A the latch clear command CNT3n1, the cutoff state release command CNT3n3, and the abnormality diagnosis command CNT3n4 containing at least the activation signal cutoff command CNT3n2.

As described above, according to a fifth aspect of the present invention, the activation signal processing unit interposed between the activation auxiliary signal group and the arithmetic control unit includes the auxiliary microprocessor always supplied with power from the in-vehicle battery.

The main microprocessor forming the arithmetic control unit includes the program memory having a large capacity, and thus has such a problem that the activation processing period is long and the power consumption is large. Meanwhile, the auxiliary microprocessor includes the program memory having a small capacity, and thus has such an advantage that the activation processing period is short and the power consumption is small, and has such an advantage that various logic circuits can be implemented by the control program without relying on individual circuits.

Thus, the following feature is provided. While the auxiliary microprocessor can directly read even a short command signal, the power consumption does not increase even when the power is always supplied from the in-vehicle battery.

Second Embodiment

Figure 7:
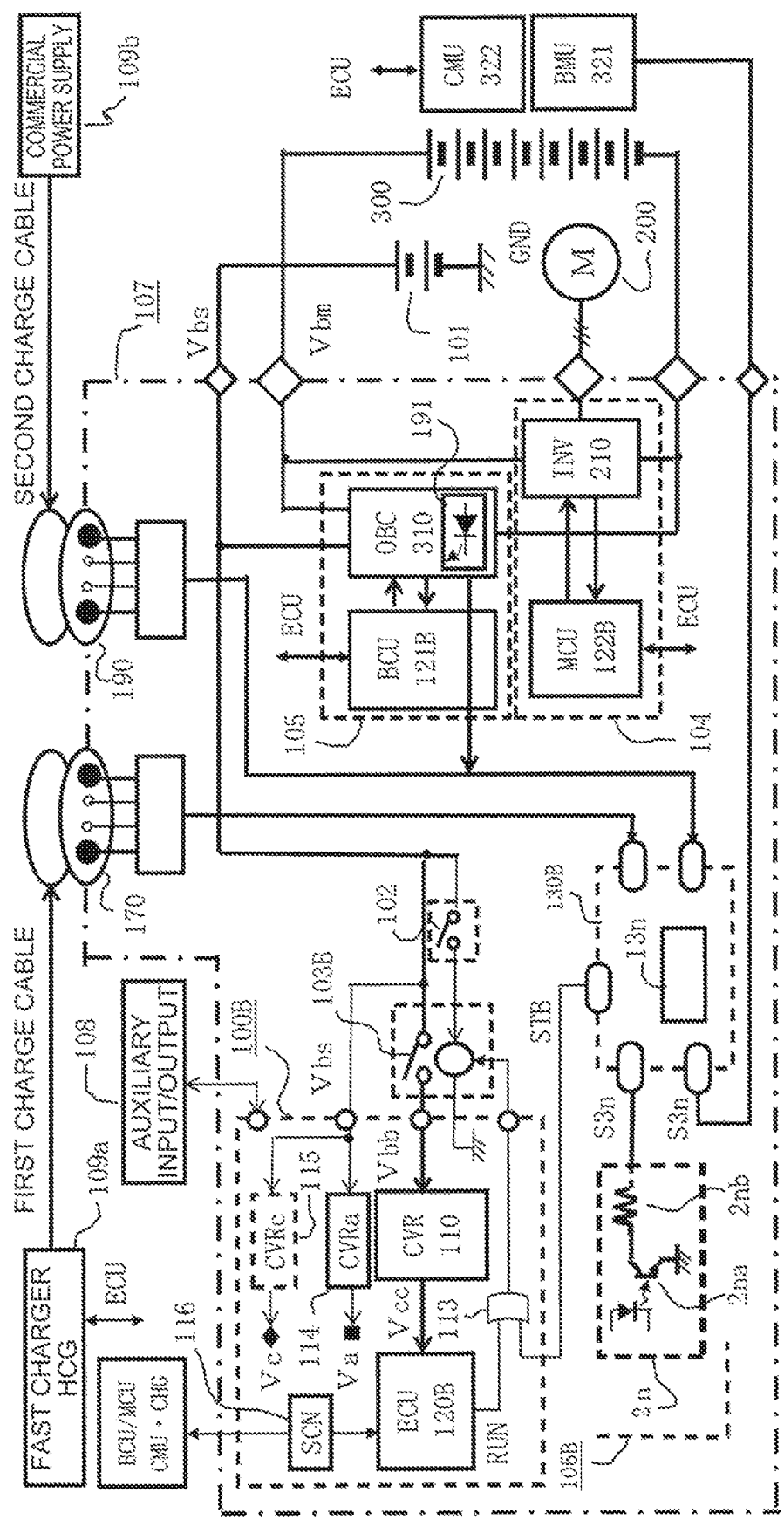
FIG. 7 is an overall circuit block diagram of an in-vehicle electronic control device including an activation signal processing unit according to a second embodiment of the present invention.

Detailed Description of Second Embodiment (1) Detailed Description of Configuration A detailed description is now given of a configuration of FIG. 7, which is an overall circuit block diagram of an in-vehicle electronic control device including an activation signal processing unit according to a second embodiment of the present invention with a focus on differences from FIG. 1.

In FIG. 7, an in-vehicle battery voltage Vbs is applied from the in-vehicle battery 101 of, for example, a DC-12 V system to an in-vehicle electronic control device 100B. A drive power supply voltage Vbb is applied through a power supply relay 103B, which is energized when the power supply switch 102 is closed. Moreover, the main electronic apparatus 104 controlled to drive when the power supply switch 102 is closed is connected to the in-vehicle electronic control device 100B.

The main electric apparatus 104 includes a travel control unit including a drive power conversion circuit 210 and a cooperating motor control unit 122B. The drive power conversion circuit 210 is a DC/AC converter for the motor for traveling 200 of the vehicle, to which power is to be supplied from the in-vehicle main battery 300 so as to drive. The main battery 300 is configured to generate a main power supply voltage Vbm of, for example, a DC-400 V system.

The auxiliary electronic apparatus 105 controlled to drive when the power supply switch 102 is opened is further connected to the in-vehicle electronic control device 100B.

This auxiliary electric apparatus 105 includes a charge control portion including a charge power conversion circuit 310 for the main battery 300 and the in-vehicle battery 101, and a cooperating charge control unit 121B.

Moreover, the in-vehicle electronic control device 100B, the main electric apparatus 104, and the auxiliary electric apparatus 105 are integrated so as to form a complex electronic control device 107. The main electric apparatus 104 includes the travel control unit. The auxiliary electric apparatus 105 includes the charge control portion.

Each of the charge control unit 121B and the motor control unit 122B include a microprocessor to be individually driven from a constant voltage power supply (not shown). Those constant voltage power supplies are activated by an arithmetic control unit 120B so as to generate stabilized voltages. Thereafter, each of the microprocessors supplies self-hold power. When the activation command from the arithmetic control unit 120B is released, each of the microprocessors executes after-run processing so as to stop the power supply.

An activation auxiliary signal group 106B connected to an inside or an outside of the in-vehicle electronic control device 100B is formed of auxiliary activation command circuits 21 to 28 (hereinafter sometimes referred to as "2n", and the same holds true hereinafter) formed by mutually connecting, in series, activation command elements 21a to 28a (hereinafter sometimes referred to as "2na") and short-to-power current limiting resistors 21b to 28b (hereinafter sometimes referred to as "2nb"), and each configured to generate an activation command signal S3n.

A part of the activation command elements 2na are configured to generate the activation command signal S3n, which is uncertain and short, and are represented by push button switches, and the other part thereof are configured to generate the activation command signal S3n, which is uncertain and long, and are represented by toggle switches or push/pull switches to be changed to a closed state or an opened state by a manual operation. The short-to-power current limiting resistor 2nb is intended for protection from a short circuit when the activation command element 2na is in contact with a power line on a positive side.

Moreover, the number of the auxiliary activation command circuits 2n is not limited to eight, and is increased or decreased in accordance with a scale of the entire system.

The in-vehicle electronic control device 100B mainly includes an arithmetic control unit 120B including a main CPU, which is a microprocessor, and an activation signal processing unit 130B.

As in the case of FIG. 1, the stabilized power supply 110 configured to generate a stabilized voltage Vcc, which is, for example, DC 5 V, from the drive power supply voltage Vbb is connected to the arithmetic control unit 120B. The arithmetic control unit 120B includes a main CPU, a nonvolatile program memory PMEM and a data memory DMEM, a volatile RAM memory RMEM, and a multi-channel AD converter ADC (see FIG. 8). The main CPU operates when the power supply relay 103B is energized. The arithmetic control unit 120B is configured to cooperate with a watchdog timer WDT so as to generate a normal operation signal RUN during a normal operation.

Moreover, when the power supply switch 102 is closed, the power supply relay 103A is energized through a drive signal composition circuit 113 and a power supply relay drive element (not shown). When the main CPU is consequently activated, and the normal operation signal RUN is generated, the operation of the main CPU continues through the drive signal composition circuit 113 and the power supply relay drive element even when the power supply switch 102 is opened. The control operation is completed by executing predetermined stop processing so as to stop the normal operation signal RUN.

The backup power supply 114 configured to generate a backup voltage Va, which is, for example, DC 5 V, from the in-vehicle battery voltage Vbs is connected to the arithmetic control unit 120B. However, important information such as learned information and abnormality occurrence information stored in the RAM memory RMEM during the operation of the main CPU is transferred to and saved in the nonvolatile data memory DMEM in an after-run period immediately after the power supply switch 102 is opened. Then, the normal operation signal RUN is stopped, and the power supply relay 103B is de-energized. Meanwhile, when the power supply switch 102 is closed, the operation start signal SIG0 is input to the main CPU through an operation start command element (not shown) as in the case of FIG. 1, to thereby execute the drive control for the main electric apparatus 104.

However, even in a case in which the power supply switch 102 is opened, when the activation signal processing unit 130B generates a composite activation signal STB, the power supply relay 103B is energized through the drive signal composition circuit 113 and the power supply relay drive element (not shown). When the main CPU is consequently activated, and the normal operation signal RUN is generated, the operation of the main CPU continues through the drive signal composition circuit 113 even when the composite activation signal STB is stopped. When the drive control for the auxiliary electric apparatus 105 is completed as a result, the auxiliary control operation is completed by executing predetermined stop processing so as to stop the normal operation signal RUN.

A plurality of individual activation processing units 13$n$ (n=1 to 8) forming the activation signal processing unit 130B are configured to generate the composite activation signal STB through individual activation elements (not shown) in response to the activation command signals S3$n$ generated by the activation command elements 2$na$, and to generate individual activation signals SIG3$n$ directed to the main CPU through individual buffer elements 13$ns$, which are, for example, NPN transistors. The main CPU is configured to execute drive control for the auxiliary electric apparatus 105 in accordance with the activation command elements 2$na$ provided for respective activation factors.

The main CPU is configured to individually or simultaneously generate a latch clear command CNT3$n$1, an activation signal cutoff command CNT3$n$2, a cutoff state release command CNT3$n$3, and an abnormality diagnosis command CNT3$n$4 to the individual activation processing unit 13$n$. A detailed description thereof is given above with reference to FIG. 2A and FIG. 2B.

A fast charge connector 170 and a normal charge connector 190 are further provided for the complex electronic control device 107. The fast charge connector 170 is connected to a fast charger 109$a$, which is a ground facility, through a first charge cable. The normal charge connector 190 is connected to a commercial AC power supply 109$b$ of, for example, AC 100 V, through a second charge cable.

An auxiliary input/output unit 108 provided outside the complex electronic control device 107 is an opening/closing command switch and an actuator for opening/closing drive for a lid, which are provided in a window hole for connecting the first and second charge cables. When the lid is closed or opened through an electric operation, an opening/closing command signal therefor forms one of the activation command elements 2$na$, and is input to the activation signal processing unit 130B.

Moreover, a periodic activation signal generated by a battery management unit 321 while the vehicle is parking forms another one of the activation command elements 2$na$, and is input to the activation signal processing unit 130B. As a result, the arithmetic control unit 120B is periodically activated so as to periodically supply power to a cell management unit 322. The cell management unit 322 transmits monitoring and diagnosis information containing an environment temperature, a charge voltage, and a state of charge of the main battery 300, which is a lithium ion battery, to the arithmetic control unit 120B.

Moreover, a part of received signals from the fast charger 109$a$ obtained from the fast charge connector 170, or a connection detection signal of the normal charge connector 190, a detection signal of a power receiving detection element 191, and the like form a part of the activation command elements 2$na$, and are input to the activation signal processing unit 130B.

A serial controller 116 provided in the in-vehicle electronic control device 100B is configured to execute communication through use of a serial signal between the arithmetic control unit 120B and the charge control unit 121B, the motor control unit 122B, the cell management unit 322, and the fast charger 109$a$.

Figure 8:
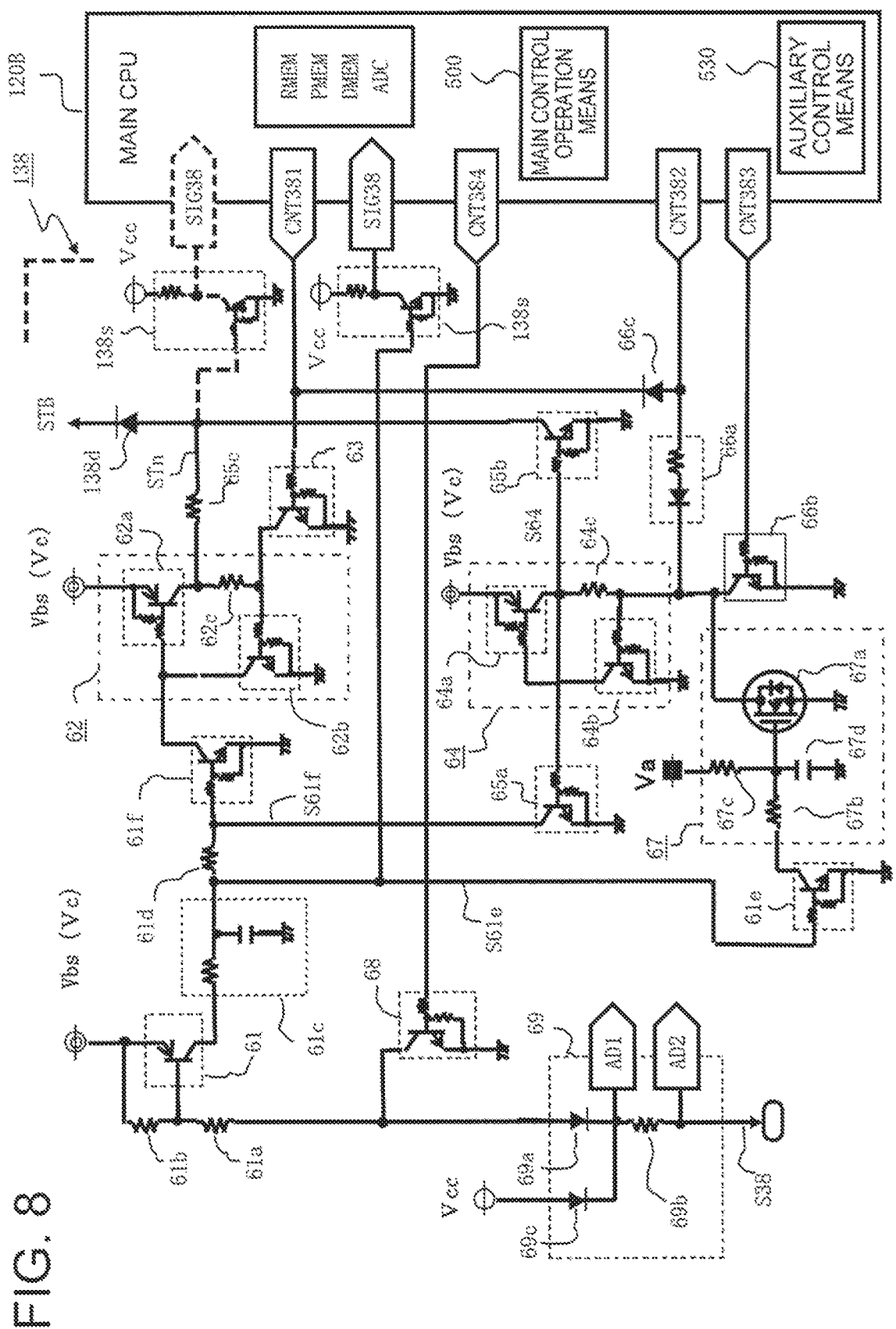
FIG. 8 is a detailed circuit diagram of a special example relating to the individual activation processing unit of FIG. 7.
Figure 9:
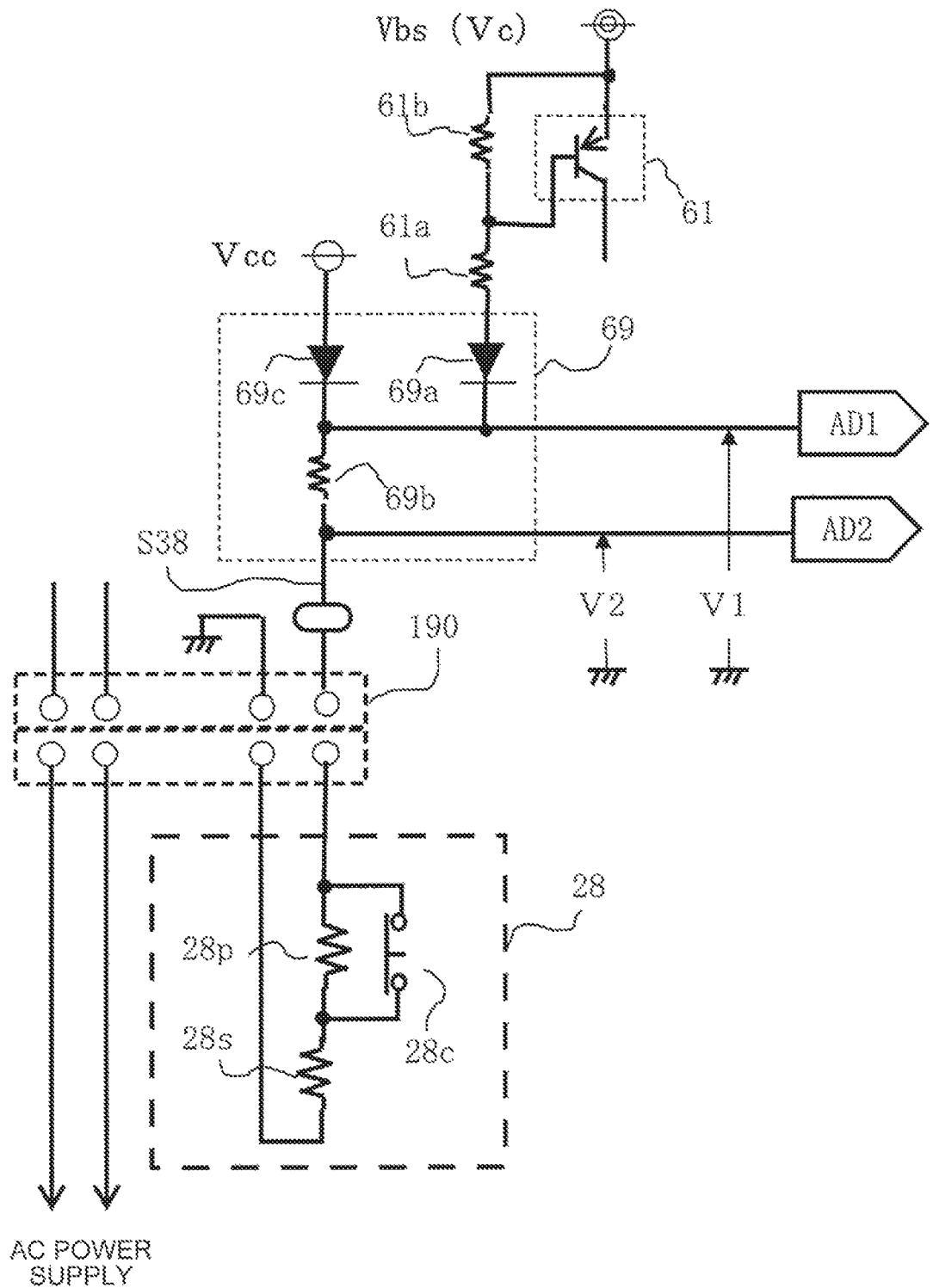
FIG. 9 is a partial detailed circuit diagram of FIG. 8.

A detailed description is now given of a configuration of FIG. 8, which is a detailed circuit diagram for illustrating a special example relating to the individual activation processing unit of FIG. 7, and FIG. 9, which is a partial detailed circuit diagram of FIG. 8.

In FIG. 8, a basic configuration of the individual activation processing unit 138 is as described above with reference to FIG. 2B. However, a resistance value detection circuit 69 suitable for connection detection of the charge cable of the normal charge connector 190 by the individual activation processing unit 138 is added, and details thereof are illustrated in FIG. 9.

Moreover, it is exemplified that the power supply for the input element 61, the activation latch unit 62, and the cutoff latch unit 64 illustrated in FIG. 2A, FIG. 2B, and FIG. 8 may be the auxiliary voltage Vc of, for example, DC 5 V, in place of the in-vehicle battery voltage Vbs, and the auxiliary voltage Vc is an output voltage of the auxiliary control power supply 115 supplied with the in-vehicle battery voltage Vbs as illustrated in FIG. 7.

In FIG. 9, the second charge cable connected to the normal charge connector 190 includes a pair of AC power supply lines, a lock switch 28$c$, a parallel resistor 28$p$, and a serial resistor 28$s$. The AC power supply lines supply charge power. The lock switch 28$c$ forms an auxiliary activation command circuit 28 (assigned to n=8). The parallel resistor 28$p$ is connected in parallel to the lock switch 28$c$. The serial resistor 28$s$ is connected in series to a parallel circuit formed of the lock switch 28$c$ and the parallel resistor 28$p$.

Meanwhile, the above-mentioned base resistor 61$a$ of the input element 61 is connected to one end of the auxiliary activation command circuit 28 through a first backflow prevention element 69a and a current detection resistor 69b of the resistance value detection circuit 69. The other end of the auxiliary activation command circuit 28 is connected to a ground circuit in the in-vehicle electronic control device 100B.

Moreover, an upstream-side voltage V1 of the current detection resistor 69b is input as a first analog signal AD1 to a multi-channel AD converter ADC of the arithmetic control unit 120B. A downstream-side voltage V2 of the current detection resistor 69b is input as a second analog signal AD2 to the multi-channel AD converter ADC of the arithmetic control unit 120B. The stabilized voltage Vcc is applied to an upstream side of the current detection resistor 69b through a second backflow prevention element 69c.

Moreover, the value of a serial combined resistor R28=R28s+R28p, which is a sum of a resistance value R28s of the serial resistor 28s and a resistance value R28p of the parallel resistor 28p, and the value of the resistance value R28s are set to values different from each other in accordance with the value of the maximum charge current permissible for the second charge cable. Simultaneously, the lock switch 28c serves as a normally closed contact, which is depressed to be opened when the second charge cable is connected, and is always closed after the second charge cable is attached.

Then, when the input element 61 is driven so as to be closed as a result of the connection of the second charge cable, the composite activation signal STB is generated by the individual activation processing unit 138 illustrated in FIG. 8. As a result, when the arithmetic control unit 120B is activated, the main CPU calculates the value of the serial combined resistor R28 or the values of the individual resistance value R28s and R28p given by the following Expression (1), Expression (2), and Expression (3):

$$(V1-V2)/R69b = V2/(R28 \text{ or } R28s) \quad (1);$$

therefore, $R28$ or $R28s = R69b \times V2/(V1-V2)$ (2); and $$R28p = R28 - R28s \quad (3).$$

R69b is a resistance value of the current detection resistor 69b, which is a known reference resistor. When the lock switch 28c is depressed to be opened, the value of the serial combined resistor R28 is calculated as given by Expression (2). When the lock switch 28c is normally closed, the resistance value R28s of the serial resistor 28s is calculated as given by Expression (2).

A combination of the serial resistor 28s and the parallel resistor 28p to be applied is determined in advance, and is stored as a data table in the data memory DMEM or the program memory PMEM. When any one of the serial combined resistance value R28 and the resistance value R28s is calculated, the other one of the serial combined resistance value R28, the resistance value R28s, and the remaining resistance value R28p are detected, and it is possible to determine whether the lock switch 28c was opened or closed at a time point of the measurement.

When the value of the selected serial combined resistor R28 or resistance value R28s of the serial resistor 28s is greatly smaller than the resistance value of the base resistor 61a, an applied voltage to the auxiliary activation command circuit 28 can be increased and stabilized by applying the stabilized voltage Vcc through use of the second backflow prevention element 69c, to thereby be able to increase calculation accuracy of the resistance value. Further, a standby current during parking without charge can be suppressed by setting the resistance value of the base resistor 61a to be large, to thereby be able to suppress power consumption under a state in which the second charge cable is left while connected.

(2) Detailed Description of Actions and Operations

A detailed description is now given of actions and operations of the in-vehicle electronic control device 100B including the activation signal processing unit 130B according to the second embodiment of the present invention, which is configured as in FIG. 7, FIG. 8, and FIG. 9 with a focus on differences from FIG. 1.

First, in FIG. 7, when the power supply switch 102 for the vehicle drive is closed, the power supply relay 103B is energized. The drive power supply voltage Vbb by the in-vehicle battery 101 is thus applied to the in-vehicle electronic control device 100B through an output contact of the power supply relay 103B, and the stabilized voltage Vcc is applied to the main CPU forming the arithmetic control unit 120B through the stabilized power supply 110.

The in-vehicle battery voltage Vbs, which is the output voltage of the in-vehicle battery 101 itself, is also input to the in-vehicle electronic control device 100B. The backup voltage Va is always generated through the backup power supply 114, to thereby maintain information stored in the RAM memory RMEM, which is the volatile memory included in the main CPU.

The main CPU to which the stabilized voltage Vcc is applied executes an internal inspection including the cooperating nonvolatile program memory PMEM and data memory DMEM, and then cooperates with the watchdog timer WDT (not shown) so as to generate the normal operation signal RUN. Further, the main CPU executes self-hold operation for the power supply relay 103B through the drive signal composition circuit 113 and the power supply relay drive element (not shown), and executes the drive control for the main electric apparatus 104 while monitoring the operation start signal SIG0 (see FIG. 1) input from the power supply switch 102 through the operation start command element (not shown).

Further, when the power supply switch 102 is opened, and the operation start signal SIG0 is thus stopped, an after-run including saving processing of transferring information on main current values contained in the RAM memory to the nonvolatile data memory DMEM is executed, and a watchdog signal is then stopped. Consequently, the normal operation signal RUN is stopped, and the power supply relay 103B is de-energized to be opened.

However, as described above, even when the power supply switch 102 is opened, when the activation signal processing unit 130B generates the composite activation signal STB, the power supply relay 103B is energized through the drive signal composition circuit 113 and the power supply relay drive element (not shown). When the main CPU is consequently activated, and the normal operation signal RUN is generated, the operation of the main CPU continues through the drive signal composition circuit 113 even when the composite activation signal STB is stopped. When the drive control for the auxiliary electric apparatus 105 is completed as a result, the auxiliary control operation is completed by executing the predetermined stop processing so as to stop the normal operation signal RUN. The detailed configuration of the individual activation processing unit 13n forming the activation signal processing unit 130B is as described above with reference to FIG. 2A and FIG. 2G, or FIG. 8.

Figure 10:
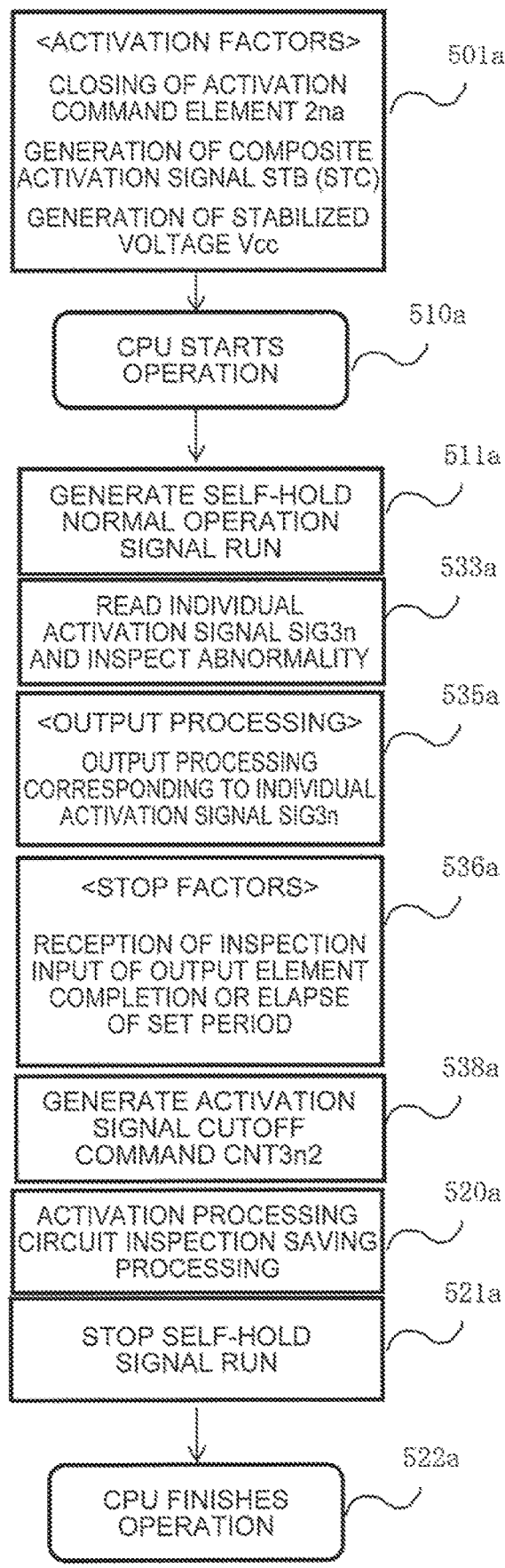
FIG. 10 is a flowchart for illustrating an operation relating to activation processing of FIG. 7 (and FIG. 12).

A detailed description is now given of FIG. 10, which is a flowchart for illustrating an operation relating to activation processing of FIG. 7.

FIG. 10 is a flowchart formed by merging FIG. 5A and FIG. 5B described above, which is limited to the state in which the power supply switch 102 is opened.

In FIG. 10, Step 501a for preparation is a step in which the activation signal processing unit 130B generates the composite activation signal STB, and the stabilized voltage Vcc is applied to the main CPU.

The next Step 510a is a step in which the main CPU starts the generation of the watchdog signal and the control operation.

The next Step 511a is a step in which the generation state of the watchdog signal is monitored by the watchdog timer WDT (not shown), and when the generation state is normal, the watchdog timer WDT generates the normal operation signal RUN.

The next Step 533a is a step corresponding to an activation signal abnormality determination means for tentatively generating, as described with reference to FIG. 3B, the latch clear command CNT3n1 for a plurality of times, to thereby determine whether or not a short-circuit abnormality or a contact failure of the activation command element 2na exists.

The next Step 535a is a step corresponding to output processing means for executing drive control for the auxiliary electric apparatus 105 corresponding to details of the individual activation signal SIG3n read in Step 533a.

The next Step 536a is a step in which an input state of a sensor activated as a result of the output processing in Step 535a is monitored to receive a detection input, or proceeds to Step 538a after a predetermined period has elapsed.

The next Step 538a is a step corresponding to activation signal cutoff means for generating the activation signal cutoff command CNT3n2 so as to activate the cutoff latch unit 64, to thereby stop the output of the activation latch unit 62 so as to stop the composite activation signal STB.

The next Step 520a is a step corresponding to control stop processing means for executing a function inspection for the activation signal processing unit 130B, and transferring and writing learned data written in the RAM memory during the operation of the main CPU and important data in an abnormality occurrence record to the nonvolatile data memory DMEM or the program memory PMEM.

For the function inspection for the activation signal processing unit 130B in Step 520a, the cutoff state release command CNT3n3 directed to the cutoff latch unit 64 and the abnormality diagnosis command CNT3n4 directed to the activation command signal S3n are used so as to execute a preliminary inspection for the activation signal processing unit 130B including the recovery determination unit 67.

The next Step 521a is a step corresponding to self-hold stop means for stopping the watchdog signal so that the watchdog timer stops the normal operation signal RUN.

In the next Step 522a, the power supply to the main CPU is stopped, and the control operation corresponding to the individual activation signal SIG3n (n=1 to 8) for this time is finished.

Figure 11:
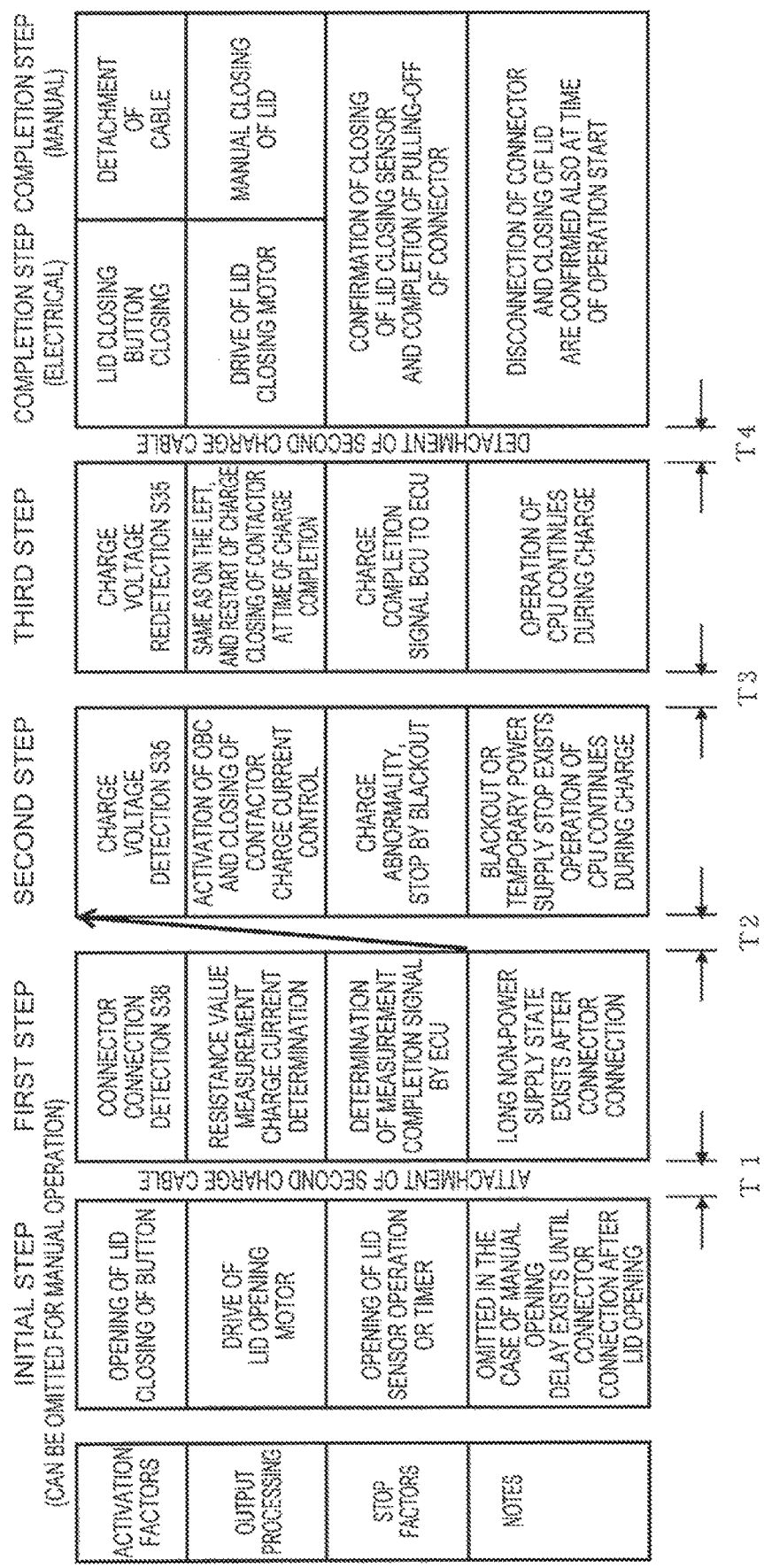
FIG. 11 is a detailed explanatory diagram of an operation procedure for a normal charge of FIG. 7.

A detailed description is now given of FIG. 11, which is a detailed explanatory diagram of an operation procedure for the normal charge of FIG. 7.

Figure 14:
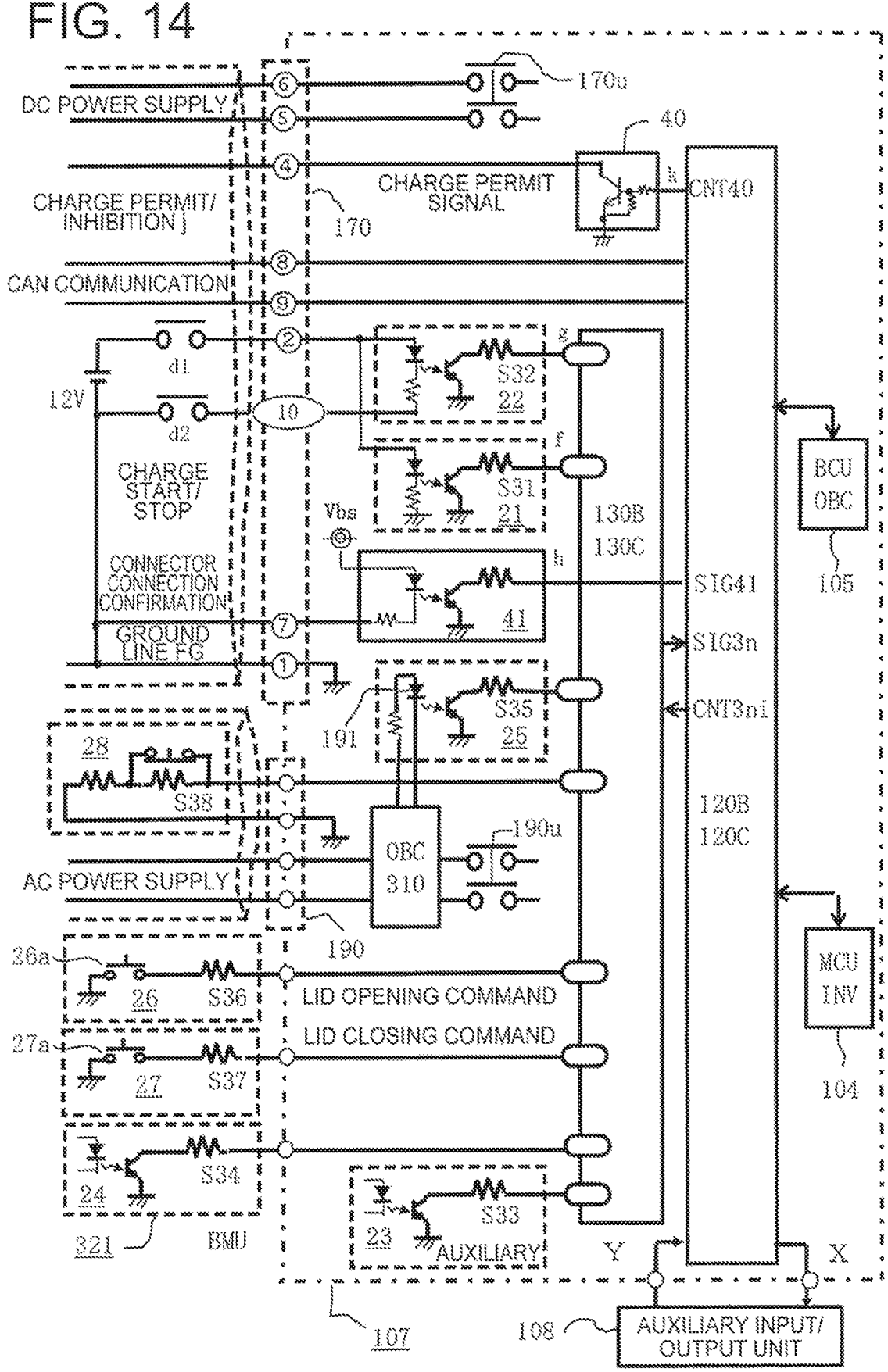
FIG. 14 is an overall connection diagram for illustrating an example of activation command signals of FIG. 12 (and FIG. 7).

In FIG. 14 described later, reference symbols are assigned to the individual activation processing unit 13n by combining the case of the normal charge in the first embodiment and the case of the fast charge in the second embodiment, and FIG. 14 is sometimes timely referred to in the following description.

In FIG. 11, the processing steps in the normal charge through use of the commercial AC power supply 109b can be roughly divided into an initial step, a first step, a second step, a third step, and a completion step in order from the leftmost column. Uncertain standby periods T1 to T4 relating to a manual operation may occur between the steps. It is thus a main point to open the power source relay 103B, to thereby stop the main CPU in those uncertain standby periods T1, T2, T3, and T4.

Moreover, in each processing step, activation factors are described in the top row, details of output processing to be executed in accordance with the activation factors are described in a next row, factors for stopping the output processing are clearly described in a lower row, and a relevant gist article is described in a bottom row.

The initial step on the leftmost column is a step relating to opening control for the lid, which is the opening/closing door for connecting the second charge cable. When the opening/closing operation is executed manually, or the opening/closing operation is an electric remote operation but is local processing independent of the main CPU, the initial step can be omitted.

When the opening/closing control for the lid is executed by the arithmetic control unit 120B, for example, a push button switch 26a for the lid opening command is connected to the auxiliary activation command circuit 26 (n=6) (see FIG. 14), and an activation factor is an activation command signal S36 (n=6) generated by the push button switch 26a.

Output processing based on the activation factor is to drive a motor for the lid opening to open through use of the main CPU.

A stop factor for the output processing is determined by an operation of a lid opening detection sensor provided for the auxiliary input/output unit 108, or a predetermined timer constant set in the program memory PMEM of the main CPU.

It is required to pay attention to such a fact that the second charge cable is not always immediately connected even when the lid is opened, and the length of an idle time to occur is not known in this case. Thus, the main CPU is configured to stop the operation when the lid is opened.

An uncertain standby period T1 between the initial step and the first step is thus a connection standby period for the connector.

The first step is a processing step after the connection operation of the second charge cable, and an activation factor thereof is an activation command signal S38 generated by the auxiliary activation command circuit 28 (see FIG. 14) illustrated in FIG. 9.

Output processing based on the activation factor is to calculate the value of the serial combined resistor R28 or the resistance value R28s in the auxiliary activation command circuit 28, and to refer to a data table, to thereby obtain a restriction value of an output current of the charge power conversion circuit 310.

A stop factor of the output processing is a state in which the main CPU transmits the current restriction value to the charge control unit 121B to acquire reception reply information.

It is required to pay attention to such a fact that a power supply switch for the commercial AC power supply 109b is not always turned on even when the connection of the second charge cable is completed, and the length of an idle time to occur is not known in this case. Thus, the main CPU is configured to stop the operation when the connection of the second charge cable is completed.

Thus, an uncertain standby period T2 between the first step and the second step is a power transmission start standby period.

When the power supply switch for the commercial AC power supply 109b has already been turned on when the second charge cable is connected, the main CPU does not stop temporarily, but immediately proceeds to the second step.

The second step is a processing step in which the charge control unit 121B and the charge power conversion circuit 310 execute charge operations directed to the main battery 300 and the in-vehicle battery 101. An activation factor therefor is an activation command signal S35 to be generated by an auxiliary activation command circuit 25 (see FIG. 14) configured to respond to the power receiving detection element 191 illustrated in FIG. 7.

Output processing based on the activation factor is to close a charge contactor 190u (see FIG. 14), and to control the output current of the charge power conversion circuit 310 based on the current restriction value calculated in the first step.

A stop factor for the output processing is originally a charge completion signal, but the stop factor in this case is defined in anticipation of an occurrence of a blackout before the charge completion, or an intentional release of the power supply switch. When such a special case occurs, the main CPU stops the operation before the charge completion.

Thus, an uncertain standby period T3 between the second step and the third step is a power supply interruption or a blackout period. The operation may proceed from this state to the completion step while skipping the third step.

When the power supply is cut off during the charge, the second charge cable may be disconnected by depressing a push button configured to open the lock switch 28c so as to detect a change of the connection detection resistor, to thereby open the charge contactor 190u. When the charge is desired to be executed again from this state, the operation proceeds to the third step through the first step. When the charge is to be stopped, the operation proceeds to the completion step.

The third step is a processing step in which a remaining charge operation is executed when the charge voltage is detected again, and an activation factor is the activation command signal S35, which is the same as that in the second step.

Output processing based on the activation factor is to close the charge contactor 190u (see FIG. 14) again, and to control the output current of the charge power conversion circuit 310 based on the current restriction value calculated in the first step.

A stop factor for the output processing is a charge completion signal generated by the charge control unit 121B. The main CPU continues the operation during the charge, and is executing serial communication of charge progress information to/from the charge control unit 121B.

Thus, an uncertain standby period T4 between the third step and the fourth step is a disconnection standby period for the second charge cable, and the second charge cable may not always be disconnected immediately after the charge completion.

The completion step is a step relating to closing control for the lid after the second charge cable is disconnected in a step (not shown). When the opening/closing operation is executed manually, or the opening/closing operation is an electric remote operation but is local processing independent of the main CPU, the completion step can be omitted.

When the opening/closing control for the lid is executed by the arithmetic control unit 120B, for example, a push button switch 27a for the lid closing command is connected to the auxiliary activation command circuit 27 (n=7) (see FIG. 14), and an activation factor is an activation command signal S37 (n=7) generated by the push button switch 27a.

Output processing based on the activation factor is to drive a motor for the lid closing to be closed through use of the main CPU.

A stop factor for the output processing is determined by an operation of a lid closing detection sensor provided in the auxiliary input/output unit 108, but the disconnection of the second charge cable is simultaneously checked.

(3) Gist and Features of Second Embodiment

As is apparent from the above description, the in-vehicle electronic control devices 100B including the activation signal processing unit 130B according to the second embodiment of the present invention includes: the arithmetic control unit 120B configured to execute the control program serving as the main control operation means 500 for starting the control operation through application of the stabilized voltage Vcc from the in-vehicle battery 101 through the power supply relay 103B configured to respond to the closing operation of the power supply switch 102 and the stabilized power supply 110 so that the normal operation signal RUN is generated, maintaining the closing operation of the power supply relay 103B, and monitoring drive control for the main electric apparatus 104 and the reaction state to the drive control, the arithmetic control unit being configured to transfer and save at least a part of the latest current information to the nonvolatile memory when the power supply switch 102 is opened, then stop the normal operation signal RUN, and de-energize and stop the power supply relay 103B; and the activation signal processing unit 130B configured to execute the control program serving as the auxiliary control means 530 for activating the arithmetic control unit 120B in response to closing operations of the plurality of activation command elements 21a, 22a, . . . , 2na even when the power supply switch 102 is opened, and monitoring drive control for the auxiliary electric apparatus 105, and the reaction state to the drive control.

The activation signal processing unit 130B includes the plurality of individual activation processing units 131, 132, . . . , 13n, to which the activation command signals S31, S32, . . . , S3n each responding to the opened state and the closed state of the activation command element 2na (n=1, 2, . . . , n, the same applies hereinafter) are to be input, respectively.

A part of the plurality of activation command elements 2na are configured to generate the activation command signal S3n, which is uncertain and short in period, and are represented by push button switches, and another part thereof are configured to generate the activation command signal S3n, which is uncertain and long in period, and are represented by any one of toggle switches and push/pull plugs to be changed to any one of a closed state and an opened state by a manual operation.

Further, each of the plurality of individual activation processing units 13n includes the activation latch unit 62 configured to store generation of a corresponding one of the activation command signals S3n, couple the composite activation signals STn, each of which is the output signal from the activation latch unit, to one another so as to form a logical OR, to thereby generate the composite activation signal STB, and generate the individual activation signal SIG3n for individually inputting a generation state of a corresponding one of the activation command signals S3n to each of the arithmetic control unit 120B.

The arithmetic control unit 120B is configured to: start the control operations when the stabilized voltage Vcc is applied through the power supply relay 103B to be driven so as to be closed in response to the composite activation signal STB, and use the normal operation signal RUN to maintain the operation state of the power supply relay 103B; and read the individual activation signals SIG3n to execute the drive control for the auxiliary electric apparatus 105, and generate the activation signal cutoff commands CNT3n2 for stopping the output of the activation latch unit 62 until the generation of the normal operation signal RUN is stopped as a result of any one of the operation confirmation accompanying the drive control and the determination of elapse of the predetermined period.

The individual activation processing unit 13n further includes the cutoff latch unit 64 and the recovery determination unit 67.

The cutoff latch unit 64 is configured to be driven so as to be set by the activation signal cutoff command CNT3n2, and stop the generation of the composite activation signal STn when the plurality of activation command elements 2na are in any one of the normally closed state and the abnormally closed state.

The recovery determination unit 67 is configured to reset the cutoff latch unit 64 when the plurality of activation command elements 2na are in any one of the normally opened state and in the returned-to-opened state, and enable the generation of the composite activation signals STn when the plurality of activation command elements 2na are closed.

In the in-vehicle electronic control device 100B, the main electric apparatus 104 including the motor control unit 122B for the motor for traveling 200, to which power is to be supplied so as to be driven from the in-vehicle main battery 300 and the drive power conversion circuit 210, and the auxiliary electric apparatus 105 including the charge control unit 121B for the main battery 300 and the in-vehicle battery 101 and the charge power conversion circuit 310 are combined so as to form complex the electronic control device 107 for an electric vehicle.

The complex electronic control device 107 includes the normal charge connector 190, to which an AC voltage is to be applied from the commercial AC power supply 109b of general household through the second charge cable.

To the activation signal processing unit 130B, the eighth activation command signal S38 for detecting the connection state of the normal charge connector 190 is input as the activation command signals S3n, and the fifth activation command signal S35 for detecting the power reception state of the power supply terminal of the normal charge connector 190 is input, to thereby generate the composite activation signal STB.

Further, when the eighth activation command signal S38 detects the connection state of the normal charge connector 190, and the fifth activation command signal S35 detects the power reception state of the normal charge connector 190, the arithmetic control units 120B applies charge control to the main battery 300 and the in-vehicle battery 101 through the charge control unit 121B, even when the power supply switch 102 is in the opened state.

The activation signal processing unit 130B is configured to stop the power supply to each of the arithmetic control unit 120B when the normal charge connector 190 is not in the power reception state even when the connection state of the normal charge connector 190 is detected, and start the power supply to each of the arithmetic control unit 120B when the normal charge connector 190 is determined to be in the power reception state.

As described above, according to a sixth aspect of the present invention, the in-vehicle electronic control device forms the complex electronic control device configured to execute the drive control for the motor for traveling of the electric vehicle, and execute the charge control for the main battery for the motor drive and the in-vehicle battery mounted as the auxiliary battery for the control. The functions are distributed so that when the power supply switch is closed, the drive control is executed, and when the power supply switch is opened, the charge control is executed.

A charge of the in-vehicle battery for the control from the main battery can be executed while the power supply switch is closed as an exception.

Thus, the following feature is provided. In the unspecified standby period occurring from the connection of the charge cable to the start of the supply of the ground power supply, in the unspecified standby period caused by a blackout or a temporary power supply stop occurring during the charge, and in the unspecified standby period from the disconnection of the charge cable to the closing of the lid, the power supply to the arithmetic control unit is stopped, to thereby be able to suppress an occurrence of wasteful power consumption in the non-charge state.

To the activation signal processing unit 130B, the sixth activation command signal S36, which is the lid opening command for the lid, which is the opening and closing door for covering the entire normal charge connector 190 and the seventh activation command signal S37, which is the lid closing command for the lid, are input as the activation command signals S3n, to thereby generate the composite activation signal STB.

The auxiliary input/output unit 108 including the opening/closing drive mechanism for the lid and the detection sensor for the opened state and the closed state of the lid is connected to the arithmetic control unit 120B.

The arithmetic control unit 120B is further configured to generate a control output directed to the opening/closing drive mechanism while maintaining the operation state of the power supply relay 103B activated through the generation of one of the sixth activation command signal S36 and the seventh activation command signal S37, and complete the control operation in response to the state of the detection sensor, to thereby execute predetermined stop processing so that each of the power supply relay 103B is de-energized.

As described above, according to a seventh aspect of the present invention, the activation signal processing unit for the arithmetic control unit is configured to input the sixth activation command signal S36 and the seventh activation command signal S37 relating to the opening/closing operation of the lid, which is executed in the pre-stage of the charge start and the post-stage of the charge completion of the batteries of the electric vehicle, to thereby execute the opening/closing operation for the lid through use of the auxiliary input/output unit.

Thus, the following feature is provided. In the uncertain standby periods before the connection of the connector and the start of the charge operation after the lid is opened, and in the uncertain standby period after the charge completion to the disconnection of the connector, the power supply to the arithmetic control unit is stopped, to thereby suppress the occurrence of the wasteful power consumption in the non-charge state.

The same applies to a third embodiment of the present invention.

To the activation signal processing unit 130B, the fourth activation command signal S34, which is a periodic pulse signal generated by the battery management unit 321, is input as the activation command signal S3n, to thereby generate the composite activation signal STB.

The arithmetic control unit 120B is configured to be periodically activated by the fourth activation command signal S34, to thereby periodically supply power to a cell management unit 322, and the cell management unit 322 is configured to transmit the monitoring and diagnosis information containing the environment temperature, the charge voltage, and the state of charge of the main battery 300, which is the lithium ion battery, to the arithmetic control unit 120B.

As described above, according to an eighth aspect of the present invention, the fourth activation command signal S34, which is the pulse signal periodically generated, is input to the activation signal processing unit for the arithmetic control unit. As a result, the power is periodically supplied to the arithmetic control unit and the cell management unit, and the monitoring and diagnosis information on the main battery is transmitted to the arithmetic control unit.

Thus, the following feature is provided. The arithmetic control unit and the cell management unit are configured to be periodically activated for a short period by the battery management unit, which is a periodic wakeup activation timer that consumes low power, and hence the power consumption always occurring is suppressed.

The same applies to the third embodiment.

The resistor circuit formed of the lock switch 28c configured to be depressed to be opened and closed when the charge gun is inserted and extracted, the parallel resistor 28p connected to the lock switch, and the serial resistor 28s connected in series to the parallel circuit including the lock switch 28c and the parallel resistor 28p is connected to the mating connector provided on the side of the second charge cable to be connected to the normal charge connector 190, to thereby form the auxiliary activation command circuit 28 configured to generate the eighth activation command signal S38 directed to the activation signal processing unit 130B.

The value of the serial combined resistor R28=R28s+R28p, which is the sum of the resistance value R28s of the serial resistor 28s and the resistance value R28P of the parallel resistor 28p and the value of the resistance value R28s changes in accordance with the value of the maximum charge current permitted for the second charge cable.

The input element 61, which is a transistor to which a current is to be supplied so as to be driven by the eighth activation command signal S38, to thereby generate the set input signal for the activation latch unit 62, is configured to be driven so as to be brought into a conductive state by the serial circuit including the base resistor 61a, the first backflow prevention element 69a, the current detection resistor 69b, and the serial combined resistor R28. Further, the upstream-side voltage V1 and the downstream-side voltage V2 of the reference resistor R69b, which is the resistance value of the current detection resistor 69b, are input as the first analog signal AD1 and the second analog signal AD2, respectively, to the multi-channel AD converter ADC arranged for the arithmetic control unit 120B.

The activation signal processing unit 120B is configured to generate the composite activation signal STB in response to closing of the input element 61, the arithmetic control unit 120B uses the following Expression (1) and the following Expression (2) so as to calculate one of the serial combined resistor R28 and the resistance value R28s of the serial resistor 28s when the arithmetic control unit 130B is activated, the conversion data stored in advance in conversion data memory is used to set the maximum charge current for the charge control unit 121B, and conversion detected resistance value varies in accordance with the opened state and the closed state of the lock switch 28C:

$$(V1-V2)/R69b=V2/(R28 \text{ or } R28s) \quad (1); \text{ and}$$

$$\text{therefore, } R28 \text{ or } R28s=R69b \times V2/(V1-V2) \quad (2).$$

As described above, according to a ninth aspect of the present invention, the resistor circuit serving as the auxiliary activation command circuit is provided for the second charge cable connected to the normal charge connector, and generates the eighth activation command signal S38 when the second charge cable is connected, to thereby activate the arithmetic control unit through the activation signal processing unit.

Moreover, the activated arithmetic control unit is configured to calculate the value of the serial combined resistor R28 or the resistance value R28s of the serial resistor in the second charge cable, so as to restrict the maximum value of the charge current by the charge control unit.

Thus, the following feature is provided. The value of the serial combined resistor R28 or the resistance value R28s of the serial resistor is accurately measured through the multi-channel AD converter after the arithmetic control unit is activated, and hence various values can be set as the resistance value of the serial combined resistor R28 or the resistance value R28s, and the set value of the common maximum charge current can be read from the data table irrespective of whether the lock switch is opened or closed.

Moreover, the following feature is provided. The resistance value of the base resistor, the current detection resistor, or the serial/parallel resistor is set to be large in the uncertain charge standby periods, in which the second charge cable is connected, and which are in the non-charge state. As a result, it is possible to suppress the current flowing into the input element, to thereby suppress the consumed current in the charge standby periods.

In a first case in which the parallel resistor in the cable is set to be large and the parallel resistor is manually closed by the lock switch when the charge connector is mounted, the base current of the input element can be secured in the mounted state, and simultaneously, the consumed current in the charge standby period can further be suppressed.

Meanwhile, in a second case in which the lock switch is configured to be opened when the charge connector is mounted, the lock switch is normally closed, and hence there is provided such an advantage that a contact failure between contacts hardly occurs. However, but the consumed current increases in the charge standby state, and hence it is preferred that the resistance value R28s of the serial resistor be set to be large, and the resistance value R28p of the parallel resistor be set to be small.

In any of the cases, the following feature is provided. When any one of the serial combined resistor R28, and the individual resistance values R28s and R28p are determined, and the remaining resistance values can be determined by appropriately setting the combination of the individual resistance value R28s and the resistance value R28p.

Third Embodiment

Figure 12:
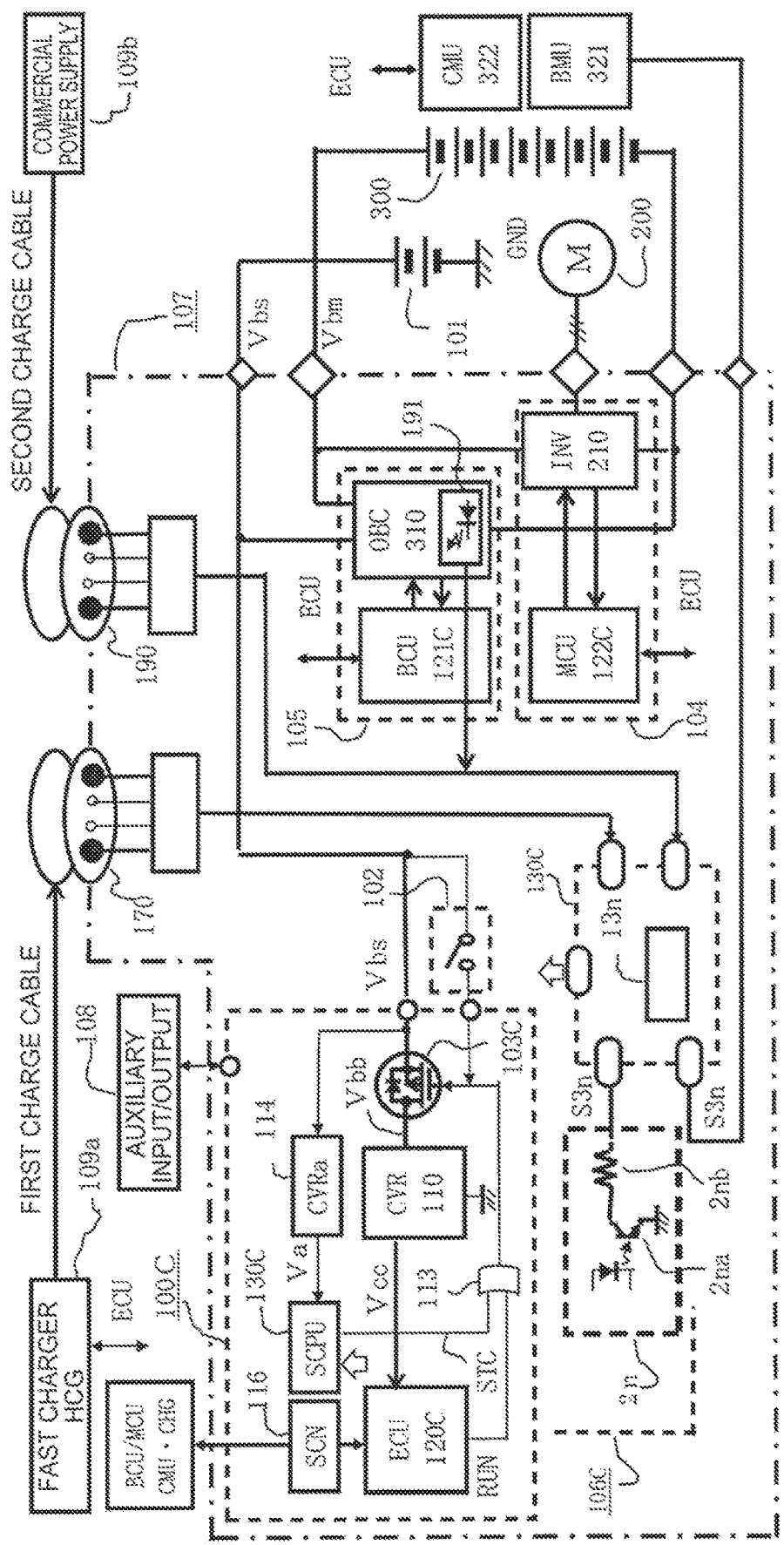
FIG. 12 is an overall circuit block diagram of an in-vehicle electronic control device including an activation signal processing unit according to a third embodiment of the present invention.
Figure 13:
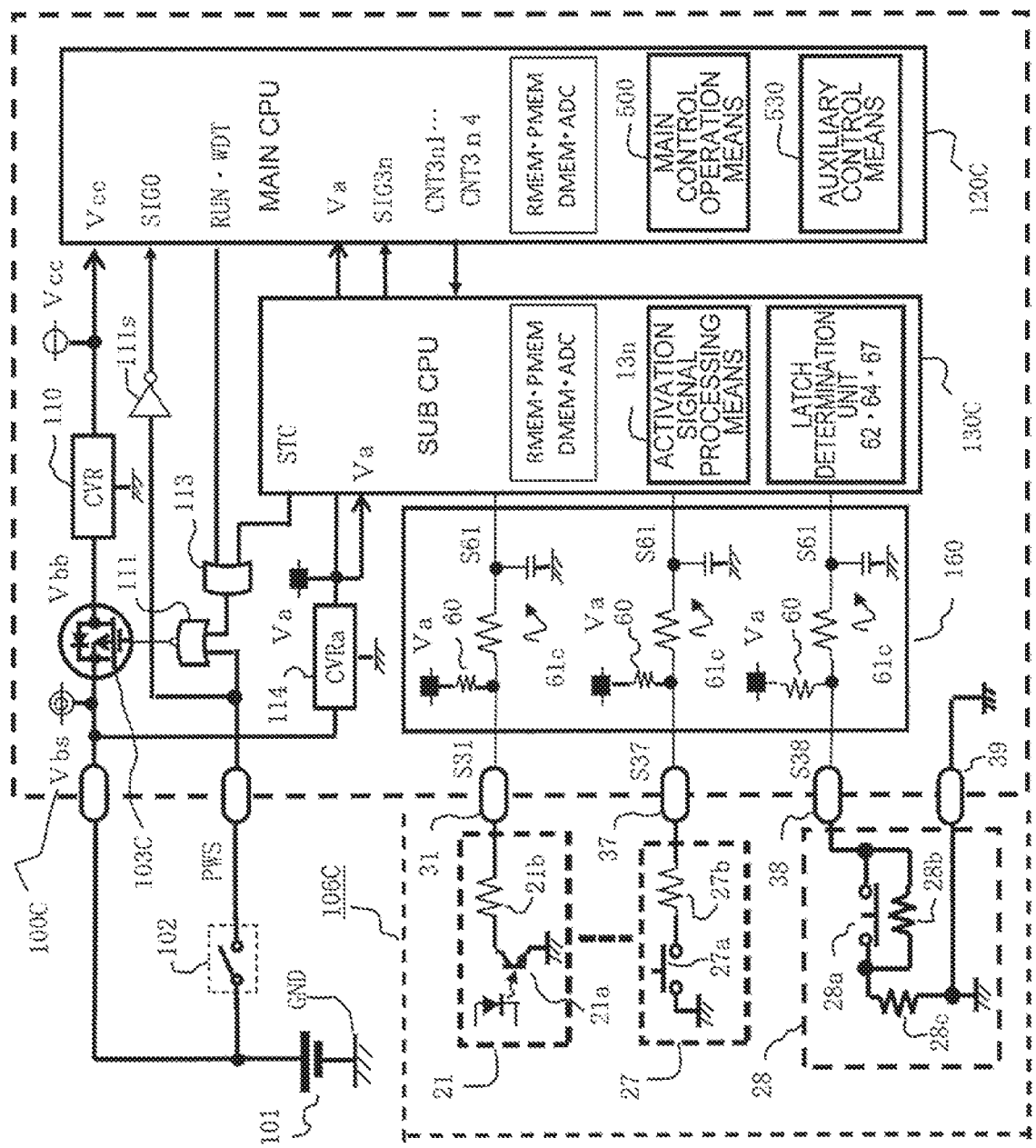
FIG. 13 is an overall circuit diagram relating to the activation signal processing unit of FIG. 12.

Detailed Description of Third Embodiment (1) Detailed Description of Configuration A detailed description is now given of configurations of FIG. 12, which is an overall circuit block diagram of an in-vehicle electronic control device including an activation signal processing unit according to the third embodiment of the present invention, and FIG. 13, which is an overall circuit diagram relating to the activation signal processing unit of FIG. 12 with a focus on differences from FIG. 1.

In FIG. 12, an in-vehicle battery voltage Vbs is applied from the in-vehicle battery 101 of, for example, a DC-12 V system to an in-vehicle electronic control device 100C. A drive power supply voltage Vbb is applied through a power supply relay 103C, which is energized when the power supply switch 102 is closed. Moreover, the main electronic apparatus 104 controlled to drive when the power supply switch 102 is closed is connected to the in-vehicle electronic control device 100C.

The main electric apparatus 104 includes a travel control unit including a drive power conversion circuit 210 and a cooperating motor control unit 122C. The drive power conversion circuit 210 is a DC/AC converter for the motor for traveling 200 of the vehicle, to which power is to be supplied from the in-vehicle main battery 300 so as to drive. The main battery 300 is configured to generate a main power supply voltage Vbm of, for example, a DC-400 V system.

The auxiliary electronic apparatus 105 controlled to drive when the power supply switch 102 is opened is further connected to the in-vehicle electronic control device 100C.

This auxiliary electric apparatus 105 includes a charge control portion including a charge power conversion circuit 310 for the main battery 300 and the in-vehicle battery 101, and a cooperating charge control unit 121C.

Moreover, the in-vehicle electronic control device 100C, the main electric apparatus 104 (travel control unit), and the auxiliary electric apparatus 105 (charge control portion) are integrated so as to form the complex electronic control device 107.

An activation auxiliary signal group 106C connected to an inside or an outside of the in-vehicle electronic control device 100C is formed of auxiliary activation command circuits 21 to 28 (hereinafter sometimes referred to as "2n", and the same holds true hereinafter) formed by mutually connecting, in series, activation command elements 21a to 28a (hereinafter sometimes referred to as "2na") and short-to-power current limiting resistors 21b to 28b (hereinafter sometimes referred to as "2nb"), and each configured to generate an activation command signal S3n.

A part of the activation command elements 2na are configured to generate the activation command signal S3n, which is uncertain and short, and are represented by push button switches, and the other part thereof are configured to generate the activation command signal S3n, which is uncertain and long, and are represented by toggle switches or push/pull switches to be changed to a closed state or an opened state by a manual operation. The short-to-power current limiting resistor 2nb is intended for protection from a short circuit when the activation command element 2na is in contact with a power line on a positive side.

Moreover, the number of the auxiliary activation command circuits 2n is not limited to eight, and is increased or decreased in accordance with a scale of the entire system.

The in-vehicle electronic control device 100C mainly includes an arithmetic control unit 120C including a main CPU, which is a microprocessor, and an activation signal processing unit 130C.

Thus, the activation signal processing unit 130C is formed through use of the above-mentioned sub CPU illustrated in FIG. 6 in place of the activation signal processing unit 130A formed of the hardware logic circuit of FIG. 1.

As in the case of FIG. 1, the stabilized power supply 110 configured to generate a stabilized voltage Vcc, which is, for example, DC 5 V, from the drive power supply voltage Vbb is connected to the arithmetic control unit 120C. The arithmetic control unit 120C includes a main CPU, a nonvolatile program memory PMEM and a data memory DMEM, a volatile RAM memory RMEM, and a multi-channel AD converter ADC (see FIG. 13). The main CPU operates when the power supply relay 103C is energized. The arithmetic control unit 120C is configured to cooperate with a watchdog timer WDT so as to generate a normal operation signal RUN during a normal operation.

Moreover, when the power supply switch 102 is closed, the power supply relay 103C is energized through a power supply relay drive element 111 (see FIG. 13). When the main CPU is consequently activated, and the normal operation signal RUN is generated, the operation of the main CPU continues through the drive signal composition circuit 113 and the power supply relay drive element 111 even when the power supply switch 102 is opened. The control operation is completed by executing predetermined stop processing so as to stop the normal operation signal RUN.

The backup power supply 114 configured to generate a backup voltage Va, which is, for example, DC 5 V, from the in-vehicle battery voltage Vbs is connected to the arithmetic control unit 120C. However, important information such as learned information and abnormality occurrence information stored in the RAM memory RMEM during the operation of the main CPU is transferred to and saved in the nonvolatile data memory DMEM in an after-run period immediately after the power supply switch 102 is opened. Then, the normal operation signal RUN is stopped, and the power supply relay 103C is de-energized.

Meanwhile, when the power supply switch 102 is closed, the operation start signal SIG0 is input to the main CPU through an operation start command element 111s described later with reference to FIG. 13, to thereby execute the drive control for the main electric apparatus 104.

However, even in a case in which the power supply switch 102 is opened, when the activation signal processing unit 130C generates a composite activation signal STC, the power supply relay 103C is energized through the drive signal composition circuit 113 and the power supply relay drive element 111. When the main CPU is consequently activated, and the normal operation signal RUN is generated, the operation of the main CPU continues through the drive signal composition circuit 113 even when the composite activation signal STC is stopped. When the drive control for the auxiliary electric apparatus 105 is completed as a result, the auxiliary control operation is completed by executing predetermined stop processing so as to stop the normal operation signal RUN.

In FIG. 13, the in-vehicle electronic control device 100C, which is configured to be supplied with the power from the in-vehicle battery 101 through the power supply relay 103C of a noncontact type formed of a field effect transistor and the stabilized power supply 110 to execute drive control for the main electric apparatus 104 and the auxiliary electric apparatus 105 illustrated in FIG. 12, includes the activation signal processing unit 130C provided between the arithmetic control unit 120C and the activation auxiliary signal group 106C.

While the activation signal processing unit 130A of FIG. 1 is formed of the hardware logic circuit illustrated in FIG. 2A or FIG. 2B as the plurality of individual activation processing units 13n, the activation signal processing unit 130C of FIG. 13 is formed of a sub CPU, which is an auxiliary microprocessor, and the individual activation processing units 13*n* are activation signal processing means constructed by a control program using the sub CPU.

Moreover, the power supply relay 103C is built in the in-vehicle electronic control device 100C.

Further, portions corresponding to the filter circuit 61*c* of FIG. 2A and FIG. 2B are assembled as an input interface circuit 160 in FIG. 13, and are connected between the activation auxiliary signal group 106C and the activation signal processing unit 130C.

Moreover, the activation signal processing unit 130C is supplied with power from the backup voltage Va generated by the backup power supply 114 always supplied with power from the in-vehicle battery voltage Vbs, and is configured to generate the composite activation signal STC when any one of the activation command elements 2*na* (n=1 to 8) is closed, to thereby energize the power supply relay 103C through the drive signal composition circuit 113 and the power supply relay drive element 111 so as to supply power to the arithmetic control unit 120C through the stabilized power supply 110.

The backup voltage Va is also supplied to the arithmetic control unit 120C, so as to execute a blackout hold operation for the RAM memory RMEM.

The power supply relay drive element 111 and the drive signal composition circuit 113 are configured to energize the power supply relay 103C in accordance with the power supply switch signal PWS by the power supply switch 102, the composite activation signal STC, and the normal operation signal RUN generated by the watchdog timer WDT.

In the third embodiment, the sub CPU forming the activation signal processing unit 130C is overwhelmingly small in memory capacity of the program memory and low in overall power consumption compared with the main CPU forming the arithmetic control unit 120C, and has a short response delay period at the time of the activation. The sub CPU can thus directly input even the closing signal of a push button switch, which executes closing operation in a short period. As a result, there can be provided the in-vehicle electronic control device including the activation signal processing unit that has a small standby current even when the power is always supplied to the sub CPU, and is not inferior to the hardware activation signal processing unit 130A in the first embodiment.

A detailed description is given of FIG. 14, which is an overall connection diagram for illustrating an example of an activation command signal of FIG. 12 in the second embodiment and FIG. 7 in the first embodiment.

In FIG. 14, the arithmetic control unit 120C (120B), which is a main element of the complex electronic control device 107 is configured to cooperate with the activation signal processing unit 130C (130B) so as to monitor and control the auxiliary electric apparatus 105 (charge control portion) including a charge control unit 121C (121B) and the charge power conversion circuit 310, and the main electric apparatus 104 (travel control unit) including a motor control unit 122C (122B) and the drive power conversion circuit 210. The auxiliary input/output unit 108 relating to the opening/closing control for the lid is connected outside the complex electronic control device 107.

Moreover, the auxiliary input/output unit 108 is configured to communicate a lid opening/closing drive command X and an opening/closing sensor signal Y to/from the arithmetic control unit 120C (120B)

Moreover, auxiliary activation command circuits 2*n* (n=3 is for an unused auxiliary circuit out of n=1 to 8) assigned as described later are connected to the activation signal processing unit 130C (130B).

Out of the auxiliary activation command circuits 2*n*, the auxiliary activation command circuit 26 is configured to generate the activation command signal S36 serving as the lid opening command, the auxiliary activation command circuit 27 is configured to generate the activation command signal S37 serving as the lid closing command, and the auxiliary activation command circuit 24 is configured to generate the activation command signal S34, which is the periodic command signal generated by the battery management unit 321.

Moreover, the auxiliary activation command circuit 28 contained in the second charge cable connected to the normal charge connector 190 is configured to generate the auxiliary activation command signal S38 for the connection detection of the cable.

Moreover, the auxiliary activation command circuit 25 is configured to generate the activation command signal S35 responding to the operation state of the power receiving detection element 191 configured to detect whether the power supply voltage is generated between AC power supply lines contained in the second charge cable.

The first charge cable connected to the fast charge connector 170 executes signal communication described later to/from the fast charger 109*a* on the ground. Reference symbols (d1, d2*e, f, g, h, j,* and *k*) for a pin assignment and signals of the fast charge connector 170 are based on the CHAdeMO (trademark) specifications.

A ground line FG for coupling the fast charger 109*a* on the ground and the in-vehicle complex electronic control device 107 to each other is connected to a first terminal of the fast charge connector 170.

A seventh terminal is a terminal configured to transmit a connector connection confirmation signal "h" to the arithmetic control unit 120C (120B). A connection confirmation signal reception element 41 is formed of a photo coupler to be supplied with power from the in-vehicle battery voltage Vbs through the seventh terminal.

A fourth terminal is a terminal configured to transmit a control output signal CNT40 generated by the arithmetic control unit 120C (120B) to the fast charger 109*a* as a charge permit signal "k" though a charge permit signal element 40. A second terminal and a tenth terminal are terminals to which a DC 12 V voltage on the charger side is applied when the fast charger 109*a* closes charge start/stop switches d1 and d2.

Further, the auxiliary activation command circuit 21 is formed of the photo coupler to be supplied with power from the second terminal. The activation command signal S31, which is an output signal thereof, is input as a charge start command "f" into the activation signal processing unit 130C (130B).

Moreover, an auxiliary activation command circuit 22 is formed of a photo coupler, to which a voltage between the second terminal and the tenth terminal is to be applied. The activation command signal S32, which is an output signal thereof, is input as a charge start command "g" to the activation signal processing unit 130C (130B).

A signal terminal 8 and a signal terminal 9 are relay terminals of serial signal lines for CAN communication between the fast charger 109*a* and the arithmetic control unit 120C (120B).

Moreover, a power terminal 5 and a power terminal 6 are relay terminals connected from the fast charger 109*a* to the main battery 300 through a charge contactor 170*u* of the complex electronic control device 107.

(2) Detailed Description of Actions and Operations

A detailed description is now given of actions and operations of the in-vehicle electronic control device 1000 including the activation signal processing unit 130C according to the third embodiment of the present invention, which is configured as in FIG. 12, with a focus on differences from FIG. 1.

First, in FIG. 12, FIG. 13, and FIG. 14, when the power supply switch 102 for the vehicle drive is closed, the power supply relay 103C is energized through the power supply relay drive element 111 (see FIG. 13). The drive power supply voltage Vbb by the in-vehicle battery 101 is thus applied to the in-vehicle electronic control device 100C, and the stabilized voltage Vcc is applied to the main CPU forming the arithmetic control unit 120C through the stabilized power supply 110.

The power supply relay 103C is of a transistor type built in the in-vehicle electronic control device 100C.

Moreover, the in-vehicle battery voltage Vbs, which is the output voltage of the in-vehicle battery 101 itself, is also input to the in-vehicle electronic control device 100C. The backup voltage Va is always generated through the backup power supply 114, to thereby maintain information stored in the RAM memory RMEM, which is the volatile memory of the main CPU, and supply power to the sub CPU forming the activation signal processing unit 130C.

The main CPU to which the stabilized voltage Vcc is applied executes an internal inspection including the cooperating nonvolatile program memory PMEM and data memory DMEM, and then cooperates with the watchdog timer WDT so as to generate the normal operation signal RUN. Further, the main CPU executes self-hold operation for the power supply relay 130C through the drive signal composition circuit 113 and the power supply relay drive element 111 (see FIG. 13), and executes the drive control for the main electric apparatus 104 while monitoring the operation start signal SIG0 (see FIG. 13) input from the power supply switch 102 through the operation start command element 111s (see FIG. 13).

Further, when the power supply switch 102 is opened, and the operation start signal SIG0 is thus stopped, an after-run including saving processing of transferring information on main current values contained in the RAM memory to the nonvolatile data memory DMEM is executed, and a watchdog signal is then stopped. Consequently, the normal operation signal RUN is stopped, and the power supply relay 103C is de-energized to be opened.

However, as described above, even when the power supply switch 102 is opened, when the activation signal processing unit 130C generates the composite activation signal STC, the power supply relay 103C is energized through the drive signal composition circuit 113 and the power supply relay drive element 111 (see FIG. 13). When the main CPU is consequently activated, and the normal operation signal RUN is generated, the operation of the main CPU continues through the drive signal composition circuit 113 even when the composite activation signal STC is stopped. When the drive control for the auxiliary electric apparatus 105 is completed as a result, the auxiliary control operation is completed by executing the predetermined stop processing so as to stop the normal operation signal RUN. The detailed configuration of the individual activation processing unit 13n forming the activation signal processing unit 130C is as described above with reference to FIG. 2A and FIG. 2B, or FIG. 8.

Moreover, a flowchart for illustrating an operation relating to the activation processing of FIG. 12 is as illustrated in FIG. 10.

Figure 15:
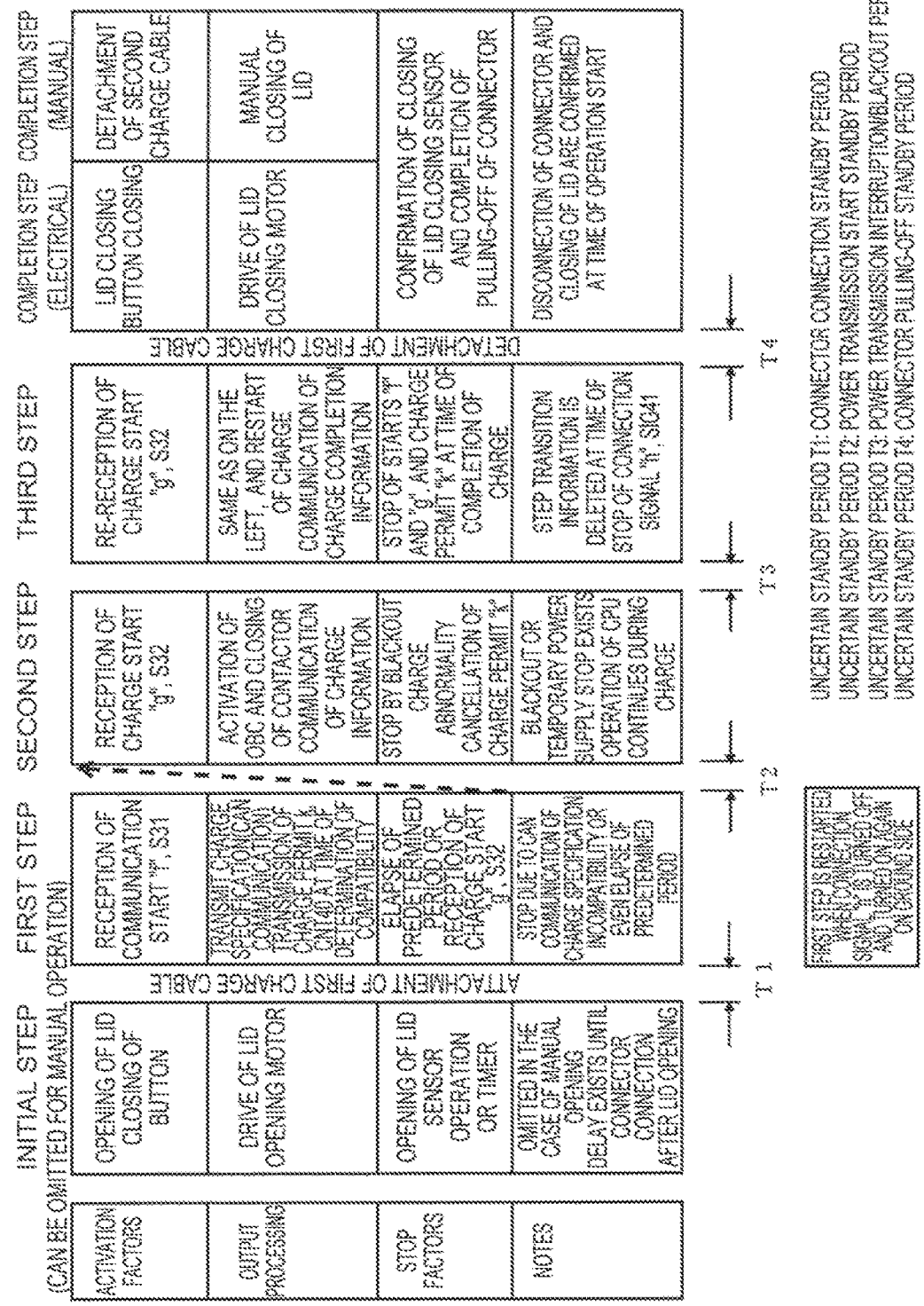
FIG. 15 is a detailed explanatory diagram of an operation procedure for a fast charge of FIG. 12.

A detailed description is now given of FIG. 15, which is a detailed explanatory diagram of an operation procedure for the fast charge of FIG. 12.

In FIG. 15, the processing steps in the fast charge through use of the fast charger 109a can be roughly divided into an initial step, a first step, a second step, a third step, and a completion step in order from the leftmost column. Uncertain standby periods T1 to T4 relating to a manual operation may occur between the steps. It is thus a main point to open the power source relay 103C, to thereby stop the main CPU in those uncertain standby periods T1, T2, T3, and T4.

Moreover, in each processing step, activation factors are described in the top row, details of output processing to be executed in accordance with the activation factors are described in a next row, factors for stopping the output processing are clearly described in a lower row, and a relevant gist article is described in a bottom row.

The initial step on the leftmost column is a step relating to opening control for the lid, which is the opening/closing door for connecting the first charge cable. When the opening/closing operation is executed manually, or the opening/closing operation is an electric remote operation but is local processing independent of the main CPU, the initial step can be omitted.

When the opening/closing control for the lid is executed by the arithmetic control unit 120C, for example, a push button switch 26a for the lid opening command is connected to the auxiliary activation command circuit 26 (n=6) (see FIG. 14), and an activation factor is an activation command signal S36 (n=6) generated by the push button switch 26a.

Output processing based on the activation factor is to drive a motor for the lid opening to open through use of the main CPU.

A stop factor for the output processing is determined by an operation of a lid opening detection sensor provided for the auxiliary input/output unit 108, or a predetermined time constant set in the program memory PMEM of the main CPU.

It is required to pay attention to such a fact that the first charge cable is not always immediately connected even when the lid is opened, and the length of an idle time to occur is not known in this case. Thus, the main CPU thus configured to stop the operation when the lid is opened.

An uncertain standby period T1 between the initial step and the first step is thus a connection standby period for the connector as in the case of FIG. 11.

The first step is a charge preprocessing step in which charge control specifications are mutually checked between the fast charger 109a and the arithmetic control unit 120C. An activation factor therefor is the activation command signal S31 to be generated by the auxiliary activation command circuit 21 illustrated in FIG. 14. The charge start/stop command 'f' generated by the fast charger 109a is applied as this signal, and is thus considered as a communication start command "f" for starting the serial communication.

Output processing based on this activation factor is to serially transmit, for example, the maximum charge current and a charge required period set on a setting display panel (not shown), as the charge specifications for the main battery 300, to the fast charger 109a through the serial controller 116, and to use the control output signal CNT 40 so as to generate the charge permit signal "k" in response to the approval by the fast charger 109a.

A stop factor for the output processing is an elapse of a predetermined period after the generation of the charge permit signal "k" or reception of the charge start signal "g" from the fast charger 109a through the auxiliary activation command circuit 22.

It is required to pay attention to such a fact that, even when the connection of the first charge cable is completed, the power supply switch of the fast charger 109a is closed, and the predetermined communication is being carried out, when the charge specifications are not compatible with one another, the main CPU stops the operation when such a state is confirmed.

Thus, an uncertain standby period T2 between the first step and the second step is a power transmission start standby period.

When the charge start signal "g" is received immediately, the main CPU does not temporarily stop, and can immediately proceed to the second step.

The second step is a processing step in which the charge control unit 121C and the charge power conversion circuit 310 execute charge operations directed to the main battery 300 and the in-vehicle battery 101. An activation factor therefor is an activation command signal S32 to be generated by the auxiliary activation command circuit 22 (see FIG. 14).

Output processing based on the activation factor is to close the charge contactor 170u (see FIG. 14), and to transmit current values of the charge current and the charge voltage measured by the charge power conversion circuit 310 to the fast charger 109a through the serial signal lines.

A stop factor for the output processing is originally a charge completion signal, but the stop factor in this case is defined in anticipation of an occurrence of a blackout before the charge completion, or an intentional release of the power supply switch. When such a special case occurs, the main CPU stops the operation before the charge completion.

Thus, an uncertain standby period T3 between the second step and the third step is a power supply interruption or a blackout period. The operation may proceed from this state to the completion step while skipping the third step.

The third step is a processing step in which a remaining charge operation is executed when the activation command signal S32 is detected again, and an activation factor is the activation command signal S32, which is the same as that in the second step.

Output processing based on the activation factor is to close the charge contactor 170u (see FIG. 14) again, and to transmit current values of the charge current and the charge voltage measured by the charge power conversion circuit 310 to the fast charger 109a through the serial signal lines.

A stop factor for the output processing is a state in which the activation command signals S31 and S32 serving as the charge start signals "f" and "g" from the fast charger 109a are stopped, and the arithmetic control unit 120C stops the control output signal CNT40 serving as the charge permit signal "k".

Thus, an uncertain standby period T4 between the third step and the completion step is a disconnection standby period for the first charge cable, and the first charge cable may not always be disconnected immediately after the charge completion.

The completion step is a step relating to closing control for the lid after the first charge cable is disconnected in a step (not shown). When the opening/closing operation is executed manually, or the opening/closing operation is an electric remote operation but is local processing independent of the main CPU, the completion step can be omitted.

When the opening/closing control for the lid is executed by the arithmetic control unit 120C, for example, a push button switch 27a for the lid closing command is connected to the auxiliary activation command circuit 27 (n=7) (see FIG. 14), and an activation factor is an activation command signal S37 (n=7) generated by the push button switch 27a.

Output processing based on the activation factor is to drive a motor for the lid closing to be closed through use of the main CPU.

A stop factor for the output processing is determined by an operation of a lid closing detection sensor provided in the auxiliary input/output unit 108, but the disconnection of the first charge cable is simultaneously checked.

The disconnection confirmation for the first charge cable is checked in accordance with stop of the connector connection confirmation signal "h" obtained by the connection confirmation signal reception element 41.

In the description given above, the activation signal processing unit 130B in the second embodiment, as in the activation signal processing unit 130A in the first embodiment, is formed of the hardware logic illustrated in FIG. 2A and FIG. 2B, or FIG. 8. The activation signal processing unit 130C in the third embodiment is formed of the control program to be executed by the sub CPU applied in the modification example of the first embodiment.

However, the activation signal processing unit 130C implemented by the sub CPU may be applied in the second embodiment, and the activation signal processing unit 130B implemented by the hardware logic may be applied in the third embodiment.

Moreover, the second embodiment is described in the case of the normal charge, and the third embodiment is described in the case of the fast charge. Both of the normal charge and the fast charge can be applied in one vehicle, and any one of the hardware logic type and the sub CPU type is applied in practice.

Moreover, when the power switch is closed, the arithmetic control units 120A, 102B, and 120C mainly execute the drive control for the main electric apparatus 104.

However, the arithmetic control units 120A, 102B, and 120C can freely control the auxiliary electric apparatus 105, and are only restricted on the program memory so as not to execute unnecessary control.

(3) Gist and Features of Third Embodiment

As is apparent from the above description, the in-vehicle electronic control device 100C including the activation signal processing unit 130C according to the third embodiment of the present invention includes: the arithmetic control unit 120C configured to execute the control program serving as the main control operation means 500 for starting the control operation through application of the stabilized voltage Vcc from the in-vehicle battery 101 through the power supply relay 103C configured to respond to the closing operation of the power supply switch 102 and the stabilized power supply 110 so that the normal operation signal RUN is generated, maintaining the closing operation of the power supply relay 103C, and monitoring drive control for the main electric apparatus 104 and the reaction state to the drive control, the arithmetic control unit being configured to transfer and save at least a part of the latest current information to the nonvolatile memory when the power supply switch 102 is opened, then stop the normal operation signal RUN, and de-energize and stop the power supply relay 103C; and the activation signal processing unit 130C configured to execute the control program serving as the auxiliary control means 530 for activating the arithmetic control unit 120C in response to the closing operations of the plurality of activation command elements 21a, 22a, . . . , 2na even when the power supply switch 102 is opened, and monitoring drive control for the auxiliary electric apparatus 105, and the reaction state to the drive control.

The activation signal processing unit 130C includes the plurality of individual activation processing units 131, 132, . . . , 13n, to which the activation command signals S31, S32, . . . , S3n each responding to the opened state and the closed state of the activation command element 2na (n=1, 2, . . . , n, the same applies hereinafter) are to be input, respectively.

A part of the plurality of activation command elements 2na are configured to generate the activation command signal S3n, which is uncertain and short in period, and are represented by push button switches, and another part thereof are configured to generate the activation command signal S3n, which is uncertain and long in period, and are represented by any one of toggle switches and push/pull plugs to be changed to any one of a closed state and an opened state by a manual operation.

Further, each of the plurality of individual activation processing units 13n includes the activation latch unit 62 configured to store generation of a corresponding one of the activation command signals S3n, couple the composite activation signals STn, each of which is the output signal from the activation latch unit, to one another so as to form a logical OR, to thereby generate the composite activation signal STC, and generate the individual activation signal SIG3n for individually inputting a generation state of a corresponding one of the activation command signals S3n to the arithmetic control unit 120B.

The arithmetic control unit 120C are configured to: start the control operations when the stabilized voltage Vcc is applied through the power supply relay 103C to be driven so as to be closed in response to the composite activation signal STC, and use the normal operation signal RUN to maintain the operation state of the power supply relay 103C; and read the individual activation signals SIG3n to execute the drive control for the auxiliary electric apparatus 105, and generate the activation signal cutoff commands CNT3n2 for stopping the output of the activation latch units 62 until the generation of the normal operation signal RUN is stopped as a result of any one of the operation confirmation accompanying the drive control and the determination of elapse of the predetermined period.

The individual activation processing unit 13n further includes the cutoff latch unit 64 and the recovery determination unit 67.

The cutoff latch unit 64 is configured to be driven so as to be set by the activation signal cutoff command CNT3n2, and stop the generation of the composite activation signal STn when the plurality of activation command elements 2na are in any one of the normally closed state and the abnormally closed state.

The recovery determination unit 67 is configured to reset the cutoff latch unit 64 when the plurality of activation command elements 2na are in any one of the normally opened state and in the returned-to-opened state, and enable the generation of the composite activation signals STn when the plurality of activation command elements 2na are closed.

The activation signal processing unit 130C includes the auxiliary microprocessor SCPU, to which power is to be supplied from the backup power supply 114, to which power is always supplied from the in-vehicle battery 101 to generate the backup voltage Va.

The input interface circuit 160, which is a filter circuit, is provided between the activation auxiliary signal group 106C including the plurality of auxiliary activation command circuits 2n and the auxiliary microprocessor SCPU.

The auxiliary microprocessor SCPU forms the plurality of the individual activation processing unit 13n, the individual activation processing units 13n contain the control program forming the activation latch unit 62, the cutoff latch unit 64, and the recovery determination unit 67, and each of the plurality of individual activation processing units 13n is configured to generate the composite activation signal STn, to thereby energize the power supply relay 103C through use of the composite activation signal STC.

Each of the plurality of individual activation processing units 13n is further configured to generate the individual activation signal SIG3n directed to the arithmetic control unit 120C, and receive from the arithmetic control unit 120C the latch clear command CNT3n1, the cutoff state release command CNT3n3, and the abnormality diagnosis command CNT3n4 containing at least the activation signal cutoff command CNT3n2.

As described above, according to the fifth aspect of the present invention, the activation signal processing unit interposed between the activation auxiliary signal group and the arithmetic control unit includes the auxiliary microprocessor always supplied with power from the in-vehicle battery.

The main microprocessor forming the arithmetic control unit includes the program memory having a large capacity, and thus has such a problem that the activation processing period is long and the power consumption is large. Meanwhile, the auxiliary microprocessor includes the program memory having a small capacity, and thus has such an advantage that the activation processing period is short and the power consumption is small, and has such an advantage that various logic circuits can be implemented by the control program without relying on individual circuits.

Thus, the following feature is provided. While the auxiliary microprocessor can directly read even a short command signal, the power consumption does not increase even when the power is always supplied from the in-vehicle battery.

In the in-vehicle electronic control device 100C, the main electric apparatus 104 including the motor control unit 122C for the motor for traveling 200, to which power is to be supplied so as to drive from the in-vehicle main battery 300 and the drive power conversion circuit 210, and the auxiliary electric apparatus 105 including the charge control unit 121C for the main battery 300 and the in-vehicle battery 101 and the charge power conversion circuit 310 are combined so as to form the complex electronic control device 107 for an electric vehicle.

The complex electronic control device 107 includes the fast charge connector 170, to which a step-up DC voltage is to be applied from the fast charger 109a, which is a ground facility, through the first charge cable.

To the activation signal processing unit 130C, the first activation command signal S31 generated in the connection state of the fast charge connector 170 is input as the activation command signals S3n, and the second activation command signal S32 responding to the power reception state of the power supply terminal of the fast charge connector 170 is input, to thereby generate the composite activation signal STC.

Further, when the first activation command signal S31 detects the connection state of the fast charge connector 170, and the second activation command signal S32 detects the power reception state of the fast charge connector 170, the arithmetic control unit 120C applies charge control to the main battery 300 and the in-vehicle battery 101 through the charge control unit 121C, even when the power supply switch 102 is in the opened state.

The activation signal processing unit 130C is configured to stop the power supply to the arithmetic control unit 120C when the fast charge connector 170 is not in the power reception state even when the connection state of the fast charge connector 170 is detected, and start the power supply to each of the arithmetic control unit 120C when the fast charge connector 170 is determined to be in the power reception state.

As described above, according to the sixth aspect of the present invention, the in-vehicle electronic control device forms the complex electronic control device configured to execute the drive control for the motor for traveling of the electric vehicle, and execute the charge control for the main battery for the motor drive and the in-vehicle battery mounted as the auxiliary battery for the control. The functions are distributed so that when the power supply switch is closed, the drive control is executed, and when the power supply switch is opened, the charge control is executed.

A charge of the in-vehicle battery for the control from the main battery can be executed while the power supply switch is closed as an exception.

Thus, the following feature is provided. In the unspecified standby period occurring from the connection of the charge cable to the start of the supply of the ground power supply, in the unspecified standby period caused by a blackout or a temporary power supply stop occurring during the charge, and in the unspecified standby period from the disconnection of the charge cable to the closing of the lid, the power supply to the arithmetic control unit is stopped, to thereby be able to suppress an occurrence of wasteful power consumption in the non-charge state.

This is the same as in the second embodiment.

The mating connector provided on the side of the first charge cable to be connected to the fast charge connector 170A includes the communication line configured to communicate the serial signal between the fast charger 109a and the arithmetic control unit 120C.

The arithmetic control unit 120C is configured to be supplied with power so as to be driven through the activation signal processing unit 130C in response to the first activation command signal S31 serving as the communication start command signal "f" transmitted from the fast charger 109a, thereby transmit the charge specification relating to the main battery 300 through use of the serial signal, and generate a control output signal CNT40 serving as the charge permit signal "k" based on the confirmation response from the fast charger 109a.

The fast charger 109a is configured to transmit the charge start signal "g" in response to the received charge permit signal "k" so that the second activation command signal S32 is generated, and the charge to the main battery 300 is started through the activation signal processing unit 130C, the arithmetic control unit 120C, and the charge control unit 121C.

The progress state of the charge to the main battery 300 is transmitted to the fast charger 109a through use of the serial signal, and the communication start command signal "f" and the charge permit signal "k" are stopped when the control output signal CNT40 is stopped as a result of completion of the charge.

As described above, according to a tenth aspect of the present invention, the first charge cable connected to the fast charge connector includes the serial signal line configured to transmit the charge specification for the main battery to the fast charger through use of the communication start command signal "f", start the charge with the charge start command signal "g", and return the progress state thereof to the fast charger.

Thus, the following feature is provided. The power supply to the arithmetic control unit is stopped as a result of blackout, charge abnormality, or charge completion, to thereby suppress the generation of the power consumption in blackout recovery and abnormality recovery periods, which are the unspecified periods.

What is claimed is:

1. An in-vehicle electronic control device comprising:
   an arithmetic controller to execute a control program serving as main control operation module for starting a control operation through application of a stabilized voltage from an in-vehicle battery through a power supply relay configured to response to a closing operation of a power supply switch and a stabilized power supply so that a normal operation signal is generated, maintaining a closing operation of the power supply relay, and monitoring drive control for a main electric apparatus and a reaction state to the drive control,
   the arithmetic controller transfers and saves at least a part of latest current information to a nonvolatile memory when the power supply switch is opened, then stops the normal operation signal, and de-energizes and stops the power supply relay; and
   an activation signal processor to execute a control program serving as auxiliary control module for activating the arithmetic controller in response to closing operations of a plurality of activation command elements even when the power supply switch is opened, and monitoring drive control for an auxiliary electric apparatus and a reaction state to the drive control,
   wherein the activation signal processor includes a plurality of individual activation processors, to which activation command signals each responding to an opened state and a closed state of the activation command element are to be input, respectively,
   wherein a part of the plurality of activation command elements are configured to generate the activation command signal, which is uncertain and short in period, and are represented by push button switches, and another part of the plurality of activation command elements generate the activation command signal, which is uncertain and long in period, and are represented by any one of toggle switches and push/pull plugs to be changed to any one of a closed state and an opened state by a manual operation,
   wherein each of the plurality of individual activation processors includes an activation latch circuit to store generation of a corresponding one of the activation command signals, couple composite activation signals, each of which is an output signal from the activation latch circuit, to one another so as to form a logical OR, to thereby generate a composite activation signal, and generate an individual activation signal for individually inputting a generation state of the corresponding one of the activation command signals to the arithmetic controller,
   wherein the arithmetic controller:
      starts the control operation when stabilized voltage is applied through the power supply relay to be driven so as to be closed in response to the composite activation signal, and uses the normal operation signal to maintain the operation state of the power supply relay; and reads the individual activation signal to execute the drive control for the auxiliary electric apparatus, and generates an activation signal cutoff command for stopping the output of the activation latch circuit until the generation of the normal operation signal is stopped as a result of any one of operation confirmation accompanying the drive control and determination of elapse of a predetermined period, wherein the individual activation processors s further includes a cutoff latch circuit and a recovery determination circuit, wherein the cutoff latch circuit is driven so as to be set by the activation signal cutoff command, and stops the generation of the composite activation signal when the plurality of activation command elements are in any one of a normally closed state and an abnormally closed state, and wherein the recovery determination circuit resets the cutoff latch circuit when the plurality of activation command elements are in any one of a normally opened state and a returned-to-opened state, and enables the generation of the composite activation signal when the plurality of activation command elements are closed.

2. The in-vehicle electronic control device according to claim 1, wherein a set input signal of the activation latch circuit is a post-stage smoothed input signal obtained through an input element, to which power is to be supplied so as to drive by the activation command signal, a filter circuit, and a serial resistor, wherein:
irrespective of whether the activation command element executes the uncertain short-period operation or the uncertain long-period operation, the individual activation signal is obtained by an individual buffer element applying logic conversion to the composite activation signal, to thereby change a system voltage; or when the activation command element executes the uncertain long-period operation and is able to stably generate the composite activation signal without intermediation of the activation latch circuit, the individual activation signal is obtained by the individual buffer element applying logic conversion to a pre-stage smoothed input signal, which is an output signal from the filter circuit, to thereby change the system voltage, wherein the arithmetic controller includes, as a part of the auxiliary control module, an activation signal abnormality determination module, which is a control program configured to generate, in one of an individual manner and a simultaneous manner, a latch clear command directed to the activation latch circuit unit arranged for each of the plurality of individual activation processors, wherein the activation latch circuit unit is a storage circuit unit of a set preferential type, which generates and stores the composite activation signal when the activation command element is closed, and maintain the generation state of the composite activation signal even when the activation command element is subsequently opened, and in which the storage of the composite activation signal is reset when the latch clear command is generated, but the composite activation signal maintains the generation state when the activation command element continues to be closed, wherein the activation signal abnormality determination module uses the individual activation signal generated when the latch clear command directed to the activation latch circuit is intermittently generated so as to monitor the opened state and the closed state of the activation command element, wherein when the activation command element generates an uncertain short-period closing signal, and the individual activation signal detects the closed state of the activation command element during a period of generation of a predetermined number of times of the latch clear command, the activation command element is determined to have a short-circuit abnormality, and wherein when the activation command element generates an uncertain long-period closing signal, the individual activation signal once detects the closed state of the activation command element, and the activation command element subsequently changes to the opened state during a predetermined period in the period of generation of the predetermined number of times of the latch clear command, the activation command element is determined to have a disconnection abnormality.

3. The in-vehicle electronic control device according to claim 1, wherein the cutoff latch circuit, when the activation signal cutoff command is generated, drives to closes a pre-stage signal cutoff element and a post-stage signal cutoff element, which cut off any one of a set input and a reset input of the activation latch circuit unit, and the composite activation signal, to thereby stop the composite activation signal, wherein the recovery determination circuit includes an opening determination element, which is a field effect transistor for resetting the cutoff latch circuit, and the opening determination element is brought into a conductive state to be cut off by a first activation element, which is brought into a conductive state when the activation command signal is generated, and is brought into a conductive state to be closed by application of a gate voltage by an open-time drive resistor when the activation command signal is stopped so that the first activation element is opened, and wherein, as the gate voltage, a backup voltage, which is a stabilized voltage generated by a backup power supply, to which power is always supplied from the in-vehicle battery, is applied.

4. The in-vehicle electronic control device according to claim 2, wherein the arithmetic controller includes control stop processing module, which is a control program to be executed when the power supply switch is opened, as a part of the main control operation module, and the control stop processing module generates a cutoff state release command and an abnormality diagnosis command for executing diagnosis for a component included in the individual activation processor, wherein the abnormality diagnosis command applies opening and closing control, in any one of an individual manner and a simultaneous manner, to a forcible closing element connected in parallel to the activation command element under a normal state in which the activation command element is not executing a closing operation, and cooperates with the latch clear command so as to monitor a behavior of the activation latch circuit, to thereby inspect whether an appropriate individual activation signal is generated, and wherein the cutoff state release command drives, in one of an individual manner and a simultaneous manner, a cutoff state release element configured to reset the cutoff latch circuit driven to be set by the activation signal cutoff command to inspect a release state of the cutoff latch circuit through use of the abnormality diagnosis command and the individual activation signal, and to inspect, based on generation and stop of the abnormality diagnosis command, whether the cutoff latch circuit driven to be set by the activation signal cutoff command is to be released by the recovery determination circuit.

5. The in-vehicle electronic control device according to claim 1,
wherein the activation signal processor includes an auxiliary microprocessor, to which power is to be supplied from any one of: an auxiliary control power supply, to which power is always supplied from the in-vehicle battery to generate an auxiliary voltage; and a backup power supply to generate a backup voltage,
wherein an interface circuit, which is a filter circuit, is provided between an activation auxiliary signal group including a plurality of auxiliary activation command circuits and the auxiliary microprocessor,
wherein the auxiliary microprocessor forms the plurality of individual activation processors, the plurality of individual activation processors contain a control program forming the activation latch circuit, the cutoff latch circuit, and the recovery determination circuit, and each of the plurality of individual activation processors generates generate the composite activation signal, to thereby energize the power supply relay through use of the composite activation signal, and
wherein each of the plurality of individual activation processors further generates the individual activation signal directed to the arithmetic controller, and receives from the arithmetic controller the latch clear command, the cutoff state release command, and the abnormality diagnosis command containing at least the activation signal cutoff command.

6. The in-vehicle electronic control device according to claim 1,
wherein, in the in-vehicle electronic control device, the main electric apparatus including a motor controller for a motor for traveling, to which power is to be supplied to be driven from an in-vehicle main battery, and a drive power conversion circuit, and the auxiliary electric apparatus including a charge controller for the main battery and the in-vehicle battery and a charge power conversion circuit are combined so as to form a complex electronic control device for an electric vehicle,
wherein the complex electronic control device includes one of: a fast charge connector, to which a step-up DC voltage is to be applied from a fast charger, which is a ground facility, through a first charge cable; and a normal charge connector, to which an AC voltage is to be applied from a commercial AC power supply of general household through a second charge cable,
wherein, to the activation signal processor, a first activation command signal to be generated in a connection state of the fast charge connector and an eighth activation command signal for detecting a connection state of the normal charge connector are input as the activation command signals, and a second activation command signal responds to a power reception state of a power supply terminal of the fast charge connector and a fifth activation command signal for detecting a power reception state of a power supply terminal of the normal charge connector are input, to thereby generate the composite activation signal,
wherein when any one of the first activation command signal and the eighth activation command signal detects the connection state of one of the fast charge connector and the normal charge connector, and one of the second activation command signal and the fifth activation command signal detects the power reception state of one of the fast charge connector and the normal charge connector, the arithmetic controller applies charge control to the main battery and the in-vehicle battery through the charge controller, even when the power supply switch is in the opened state, and
wherein the activation signal processor stops the power supply to the arithmetic controller when any one the fast charge connector and the normal charge connector is not in the power reception state even when the connection state of one of the fast charge connector and the normal charge connector is detected, and start the power supply to the arithmetic controller when one of the fast charge connector and the normal charge connector is determined to be in the power reception state.

7. The in-vehicle electronic control device according to claim 6,
wherein, to the activation signal processor, a sixth activation command signal, which is a lid opening command for a lid, which is an opening and closing door for covering the entire fast charge connector and normal charge connector and a seventh activation command signal, which is a lid closing command for the lid, are input as the activation command signals, to thereby generate the composite activation signal,
wherein the arithmetic controller has connected thereto an auxiliary input/output interface including an opening/closing drive mechanism for the lid and a detection sensor for an opened state and a closed state of the lid, and
wherein the arithmetic controller further generates a control output directed to the opening/closing drive mechanism while maintaining the operation state of the power supply relay activated through the generation of one of the sixth activation command signal and the seventh activation command signal, and complete the control operation in response to a state of the detection sensor, to thereby execute predetermined stop processing so that the power supply relay is de-energized.

8. The in-vehicle electronic control device according to claim 6,
wherein, to the activation signal processor, a fourth activation command signal, which is a periodic pulse signal generated by a battery management device, is input as the activation command signal, to thereby generate the composite activation signal, and
wherein the arithmetic controller is periodically activated by the fourth activation command signal, to thereby periodically supply power to a cell management device, and the cell management device is configured to transmit monitoring and diagnosis information containing an environment temperature, a charge voltage, and a state of charge of the main battery, which is a lithium ion battery, to the arithmetic controller.

9. The in-vehicle electronic control device according to claim 6,
wherein a mating connector provided on a side of the second charge cable to be connected to the normal charge connector has connected thereto a resistor circuit including a lock switch depressed to be opened and closed when a charge gun is inserted and extracted, a parallel resistor connected to the lock switch, and a serial resistor connected in series to a parallel circuit including the lock switch and the parallel resistor, to thereby form an auxiliary activation command circuit configured to generate the eighth activation command signal directed to the activation signal processor, wherein a value of a serial combined resistor $R28=R28s+R28p$, which is a sum of a resistance value $R28s$ of the serial resistor and a resistance value $R28p$ of the parallel resistor, and the value of the resistance value $R28s$ changes in accordance with a value of a maximum charge current permitted for the second charge cable, wherein an input element, which is a transistor to which a current is to be supplied so as to be driven by the eighth activation command signal, to thereby generate a set input signal for the activation latch circuit, is driven so as to be brought into a conductive state by a serial circuit including a base resistor, a first backflow prevention element, a current detection resistor, and the serial combined resistor, wherein an upstream-side voltage $V1$ and a downstream-side voltage $V2$ of a reference resistor $R69b$, which is a resistance value of the current detection resistor, are input as a first analog signal and a second analog signal, respectively, to a multi-channel AD converter arranged for the arithmetic controller, and wherein the activation signal processor is configured to generate the composite activation signal in response to closing of the input element, the arithmetic controller uses the following Expression (1) and the following Expression (2) so as to calculate one of the serial combined resistor $R28$ and the resistance value $R28s$ of the serial resistor when the arithmetic controller is activated, conversion data stored in advance in a data memory is used to set the maximum charge current for the charge controller, and a detected resistance value varies in accordance with the opened state and the closed state of the lock switch:

$$(V1-V2)/R69b=V2/(R28 \text{ or } R28s) \tag{1}; \text{and}$$

therefore, $R28$ or $R28s=R69b \times V2/(V1-V2)$ (2).

10. The in-vehicle electronic control device according to claim 6, wherein a mating connector provided on a side of the first charge cable to be connected to the fast charge connector includes a communication line configured to communicate a serial signal between the fast charger and the arithmetic controller, wherein the arithmetic controller is supplied with power so as to be driven through the activation signal processor in response to the first activation command signal serving as a communication start command signal "f" transmitted from the fast charger, to thereby transmit a charge specification relating to the main battery through use of the serial signal, and generate a control output signal serving as a charge permit signal "k" based on a confirmation response from the fast charger, wherein the fast charger is configured to transmit a charge start signal "g" in response to the received charge permit signal "k" so that the second activation command signal is generated, and the charge to the main battery is started through the activation signal processor, the arithmetic controller, and the charge controller, and wherein a progress state of the charge to the main battery is transmitted to the fast charger through use of the serial signal, and the communication start command signal "f" and the charge permit signal "k" are stopped when the control output signal is stopped as a result of completion of the charge.

* * * * *